United States Patent [19]

Narita

[11] 4,379,339

[45] Apr. 5, 1983

[54] ELECTRONIC TIMER

[75] Inventor: Ryuho Narita, Nagoya, Japan

[73] Assignee: Tokyo Shibaura Denki Kabushiki Kaisha, Kawasaki, Japan

[21] Appl. No.: 104,868

[22] Filed: Dec. 18, 1979

[30] Foreign Application Priority Data

| | | | |
|---|---|---|---|
| Dec. 18, 1978 | [JP] | Japan | 53-156198 |
| Feb. 14, 1979 | [JP] | Japan | 53-15674 |
| Feb. 14, 1979 | [JP] | Japan | 53-15675 |
| Feb. 23, 1979 | [JP] | Japan | 54-20483 |

[51] Int. Cl.[3] .................................................. G06F 3/02

[52] U.S. Cl. ...................................................... 364/900

[58] Field of Search ... 364/200 MS File, 900 MS File, 364/710, 569; 371/37, 59, 65, 72, 29, 25, 60, 57; 358/192.1, 127; 455/171, 181

[56] References Cited

U.S. PATENT DOCUMENTS

| | | | |
|---|---|---|---|
| 3,576,433 | 4/1971 | Lee et al. | 371/59 |
| 3,612,844 | 10/1971 | Zaffignani et al. | 371/57 |
| 3,943,493 | 3/1976 | Shelton | 364/200 |
| 4,009,339 | 2/1977 | Anderson | 371/29 |
| 4,117,542 | 9/1978 | Klausner et al. | 364/900 |

OTHER PUBLICATIONS

TMS1121 Universal Timer Data Manual, Texas Instruments Asia Limited, Sep. 1977.

*Primary Examiner*—James D. Thomas
*Assistant Examiner*—David Y. Eng
*Attorney, Agent, or Firm*—Oblon, Fisher, Spivak, McClelland & Maier

[57] ABSTRACT

The operation of an object to be controlled, operation hour data, operation day-of-week data etc. are keyed in from a keyboard randomly and are displayed by a display unit, while at the same time these are stored in an input buffer. Upon depression of a transfer key, the correctness of the key-in items stored in the input buffer is checked by a microprocessor controlled by a program stored in a read only memory. When the item is incorrect, the display of the incorrect item is flashed in the display unit to request an operator to make a key-in again. When all the items are correctly keyed in, those are transferred to the memory portion to execute a given operation.

15 Claims, 12 Drawing Figures

FIG. 1B
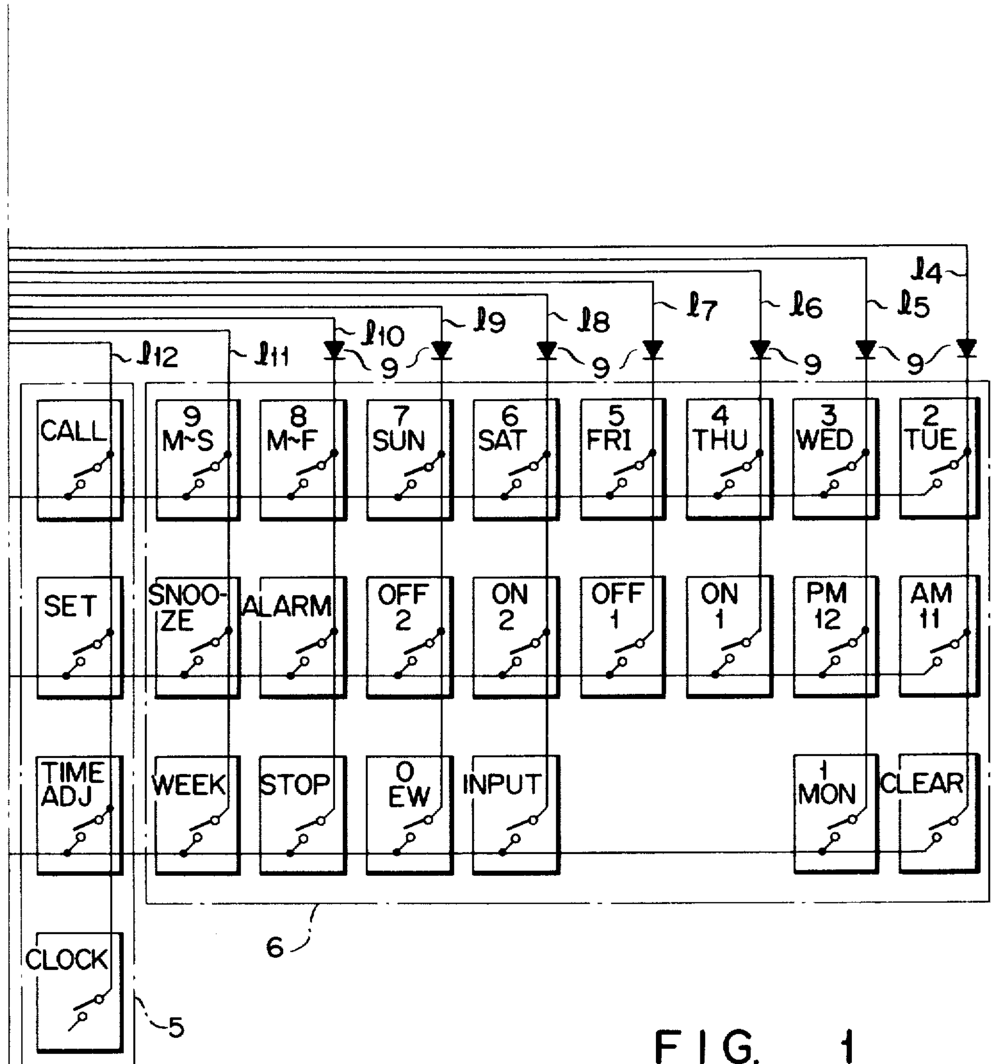
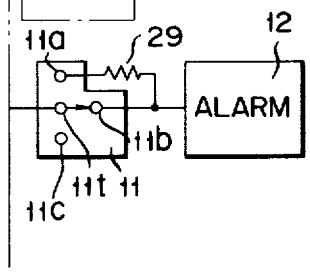
FIG. 1
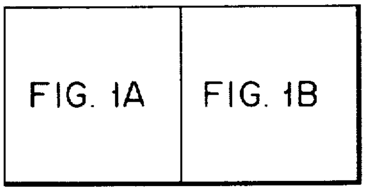

| Y \ X | 0 | 1 | 2 | 3 | 4 | 5 | 6 | 7 |
|---|---|---|---|---|---|---|---|---|
| 0 | INPUT BUFFER AND DISPLAY BUFFER | ALARM CLOCK COUNTER | FIRST STORAGE | SECOND STORAGE | THIRD STORAGE | FOURTH STORAGE | FIFTH STORAGE | SIXTH STORAGE |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | SEVENTH STORAGE | EIGHTH STORAGE | NINTH STORAGE | TENTH STORAGE | ELEVENTH STORAGE | TWELFTH STORAGE |
| 8 | | SECOND COUNTER | | | | | | |
| 9 | FLASH MODE | | | | | | | |
| 10 | MODE | | | | | | | |
| 11 | C/C | | | | | | | |
| 12 | ROUTINE CONTROL | | | | | | | |
| 13 | DISPLAY MODE | | | | | | | |
| 14 | INPUT INFORMATION | SNOOZE COUNTER | SW | KEY INPUT CONTROL | | INPUT CONTROL | | COMPARE CONTROL |
| 15 | FIRST COUNTER | CLOCK COUNTER | COMPARE RESULT | | | DISPLAY CONTROL | | |

| Y \ X | 0 | | | |
|---|---|---|---|---|
| | 3 bit | 2 bit | 1 bit | 0 bit |
| 0 | SUN | SAT | FRI | WED |
| 1 | EW | THU | TUE | MON |
| 2 | 1-SECOND DIGIT | | | |
| 3 | 10-SECONDS DIGIT | | | |
| 4 | 1-MINUTE DIGIT | | | |
| 5 | 10-MINUTES DIGIT | | | |
| 6 | 1-HOUR DIGIT | | | |
| 7 | AM | PM | 10-HOURS DIGIT | |
| 8 | COLON | | | |

FIG. 5

| Y \ X | 0 | | | |
|---|---|---|---|---|
| | 3 bit | 2 bit | 1 bit | 0 bit |
| 0 | SUN | SAT | FRI | WED |
| 1 | EW | THU | TUE | MON |
| 2 | | | SNOOZE | ALARM |
| 3 | ON 1 | OFF 1 | ON 2 | OFF 2 |
| 4 | 1-MINUTE DIGIT | | | |
| 5 | 10-MINUTES DIGIT | | | |
| 6 | 1-HOUR DIGIT | | | |
| 7 | AM | PM | 10-HOURS DIGIT | |
| 8 | COLON | | | |

FIG. 6

| Y \ X | 1 | | | |
|---|---|---|---|---|
| | 3 bit | 2 bit | 1 bit | 0 bit |
| 15 | | 1/50 OR 1/60 SECONDS DIGIT | | |
| 1 | 1/10-SECONDS DIGIT | | | |
| 2 | 1-SECOND DIGIT | | | |
| 3 | | 10-SECONDS DIGIT | | |
| 4 | 1-MINUTE DIGIT | | | |
| 5 | AM/PM | 10-MINUTES DIGIT | | |
| 6 | HOUR DIGIT | | | |
| 7 | | DAY OF WEEK | | |

| Y \ X | 2~7 | | | |
|---|---|---|---|---|
| | 3 bit | 2 bit | 1 bit | 0 bit |
| 0 OR 7 | SUN | SAT | FRI | WED |
| 1 OR 8 | EW | THU | TUE | MON |
| 2 OR 9 | | | SNOOZE | ALARM |
| 3 OR 10 | ON 1 | OFF 1 | ON 2 | OFF 2 |
| 4 OR 11 | 1-MINUTE DIGIT | | | |
| 5 OR 12 | AM/PM | 10-MINUTES DIGIT | | |
| 6 OR 13 | HOUR DIGIT | | | |

| Y \ X | 1 | | | |
|---|---|---|---|---|
| | 3 bit | 2 bit | 1 bit | 0 bit |
| 8 | 1-SECOND DIGIT | | | |
| 9 | 10-SECONDS DIGIT | | | |
| 10 | 1-MINUTE DIGIT | | | |
| 11 | 10-MINUTES DIGIT | | | |
| 12 | 1-HOUR DIGIT | | | |
| 13 | 10-HOURS DIGIT | | | |

F I G. 10C
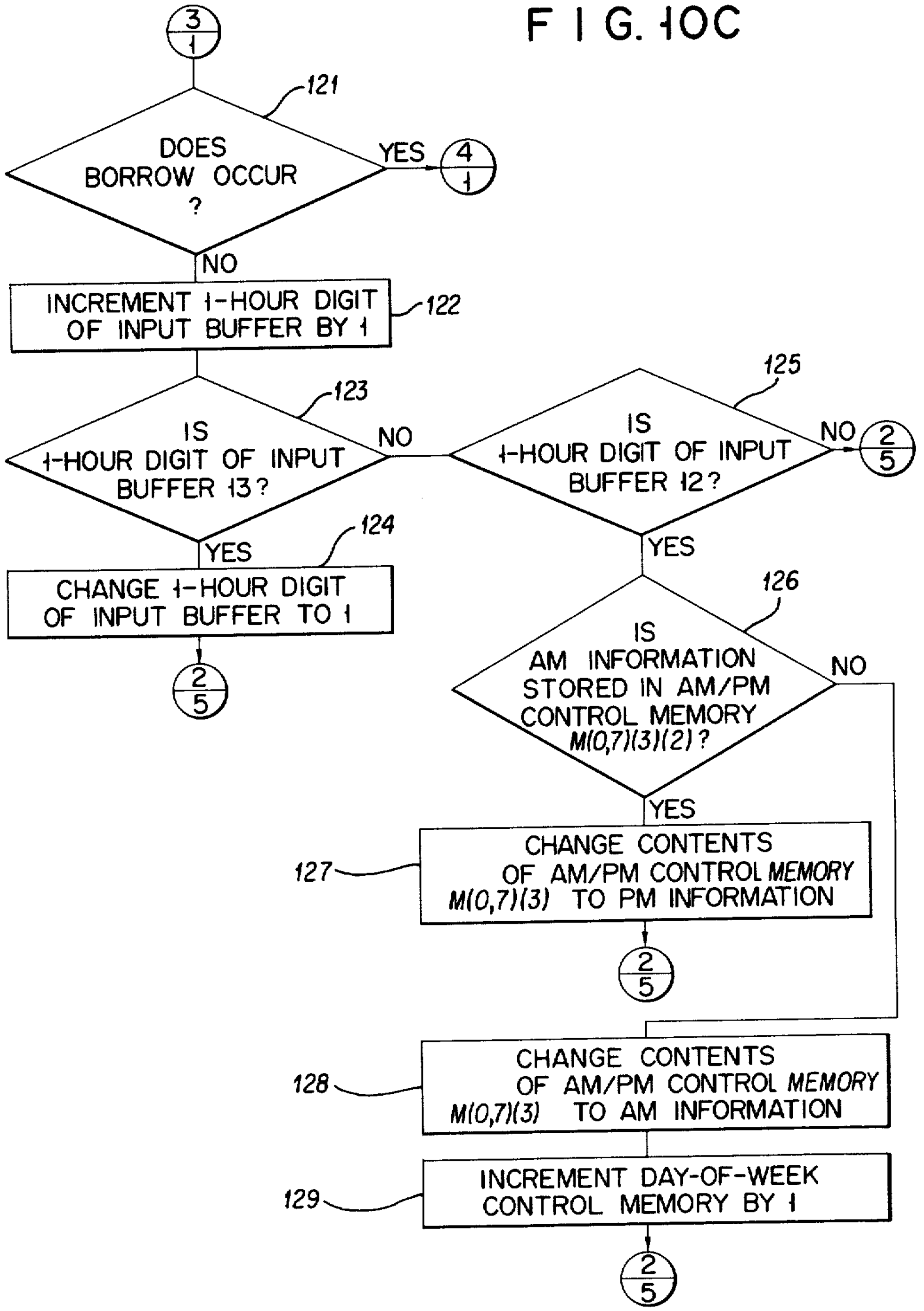

| Y \ X | 0 | | | |
|---|---|---|---|---|
| | 3 bit | 2 bit | 1 bit | 0 bit |
| 0 | 0 | 0 | 0 | 0 |
| 1 | 0 | 0 | 0 | 0 |
| 2 | 1-SECOND DIGIT | | | |
| 3 | 10-SECONDS DIGIT | | | |
| 4 | 1-MINUTE DIGIT | | | |
| 5 | 10-MINUTES DIGIT | | | |
| 6 | 1-HOUR DIGIT | | | |
| 7 | 10-HOURS DIGIT | | | |
| 8 | 0 | | | |

ELECTRONIC TIMER

BACKGROUND OF THE INVENTION

The invention relates to an electronic timer. The electronic timer is provided with a data memory for storing timer data inputted through an external designation operation. For storing the timer data into the data memory, the timer data must be arranged in a correct way. For example, for the timer of the 12-hour operating type, time must be expressed in terms of clock data within a range from 1:00 to 12:59 and with designation of A.M. or P.M. The time expression further needs a designation of the control data to control items to be controlled, such as ON and OFF data for timer switching. Unless the timer data given is arranged properly, it is necessary to inhibit such data from being inputted into the data memory of the timer. It is known that there is, for example, an electronic timer which inhibits the timer data from entering if it is the incorrect or improper arrangement.

The electronic timer, however, has no means to tell an operator as to whether the timer data has been loaded into the memory or not.

There may be a problem that when an operator designates the timer data erroneously he is apt to think that the timer data has already been set in the data storage in spite of the fact that it is not stored actually.

There is proposed an electronic timer able to judge whether the timer data is proper or not in the arrangement. In the timer, when the timer data is properly set in the data memory, a display in the display section is switched. When it is improperly set, the display is left unchanged. In this way, the timer tells an operator about a state of the setting of the timer data accurately. In using the timer, when the timer data is incorrectly set, the timer cannot indicate what portion of the timer data is improper, with a mere indication of the unchanged display. Particularly in recent data, a timer device has been developed and practically used, in which the time data of each week may be set. The timer data used in the timer of the type includes further data to designate days of the week. The above disadvantage that it is impossible to indicate the improper portion of the timer data, is seriously problematic particularly in the use of the timer device using the week timer data, in the light of the handling of the timer set.

In another conventional timer device of this type, as described in "TM1121 Universal Timer Data Manual" published by Texas Instruments Asia Limited, on September in 1977, for example, when the timer data takes the form of clock data, A.M. or P.M. also is used with relation to the clock data. On the other hand, when it is used as the time interval data, A.M. or P.M. is not used. Further in the former case, through one key transfer operation, the timer data is stored into the data memory as it stands. In the latter case, through one-time operation of the transfer key, the time data of the timer data is added to the clock data in the clock counter to be converted into the clock data, and then it is stored in the data memory.

TMS1121 Universal Timer has the following disadvantages, however. For example, in setting the timer data in the data memory in the form of the clock data, when the operator fails to designate A.M. or P.M. and under this condition, he operates the transfer key, erroneous timer data are stored in the data memory. In this case, the erroneous data stored must be erased. The erasing operation makes the operation of the timer troublesome. Generally, TV programs and FM programs are prepared for each week. When the timer operation of the timer device is set in concert with such programs, the same timer operation set is repeated, as a matter of course, every week. The timer device has no problem when it is applied for recording a serial program which is performed at the same hours every week. However, when it is applied for recording a called special program specially performed in an indefinite hour on an indefinite day of the week, the timer data once set must be erased after the timer operation starts. This is also the troublesome work for the timer operation.

Moreover, when it is designed to operate the timer device continuously for a series of days of the week from Monday to Friday, for example, the day-of-week key must be depressed each time. This also makes the timer operation troublesome.

SUMMARY OF THE INVENTION

Accordingly, an object of the present invention is to provide an electronic timer having the following useful features: the timer data may be inputted in a random manner, and not in a specific order; when the improper timer data is included in the timer data, the timer finds the improper portion of the timer data and indicates the improper portion; the operability of the timer is improved and the timer data is reliably inputted in the timer, again.

Another object of the invention is to provide an electronic timer eliminating the need for the erasing operation of the erroneous data stored by erroneous setting of the timer data from the data memory. To effect the elimination of the troublesome erasing operation, when the timer data is set in the form of the time interval data, the timer displays the clock data obtained by adding the time interval data as the timer data set to the clock data stored in the clock counter, in the first transfer operation. In this way, the timer tells an operator about the timer data to be stored for its check. Then, in the second transport operation, the timer data after displayed is transferred to the data memory. Therefore, the erroneous setting of the timer data can be checked before it is transferred to the data memory.

Yet another object of the invention is to provide an electronic timer which can select an every-week or one-week timer operation.

Still another object of the invention is to provide an electronic timer which can select a continuous operation from Monday to Friday or from Monday to Sunday.

To achieve the above objects, there is provided an electronic timer comprising, timer data designating means for designating timer data to control the operation of an object to be controlled; an input buffer for temporarily storing the timer data specified by the timer data designating means; at least one data storage; timer data transfer means for transferring the timer data stored in the input buffer to the data storage for storing it therein; display means for displaying at least timer data stored in the input buffer; judgment means for judging whether the timer data is proper or not when the transfer operation of the timer data starts by the timer data transfer means for each constituent of the timer data; abnormal display control means for causing the display means to display an abnormal display corresponding to an abnormal constituent of the timer data when an abnormal timer data is detected by the judgment means.

BRIEF DESCRIPTION OF THE DRAWINGS

Other objects and features of the invention will be described from the following description taken in connection with the accompanying drawings, in which:

FIG. 1A and FIG. 1B show a circuit arrangement of an embodiment of an overall of an electronic timer according to the invention;

FIG. 1 shows the relation between FIG. 1A and FIG. 1B

FIG. 3 shows a memory map of a RAM used in a microcomputer of the circuit in FIG. 1;

FIG. 4 shows the construction of an input/display buffer in the RAM when it is storing the clock data;

FIG. 5 shows the construction of the input/display buffer when it is storing the timer data;

FIG. 6 shows the construction of a clock counter in the RAM;

FIG. 10A to FIG. 10D show a flow chart to illustrate how the time addition is performed;

DESCRIPTION OF THE PREFERRED EMBODIMENTS

Figure 1A:
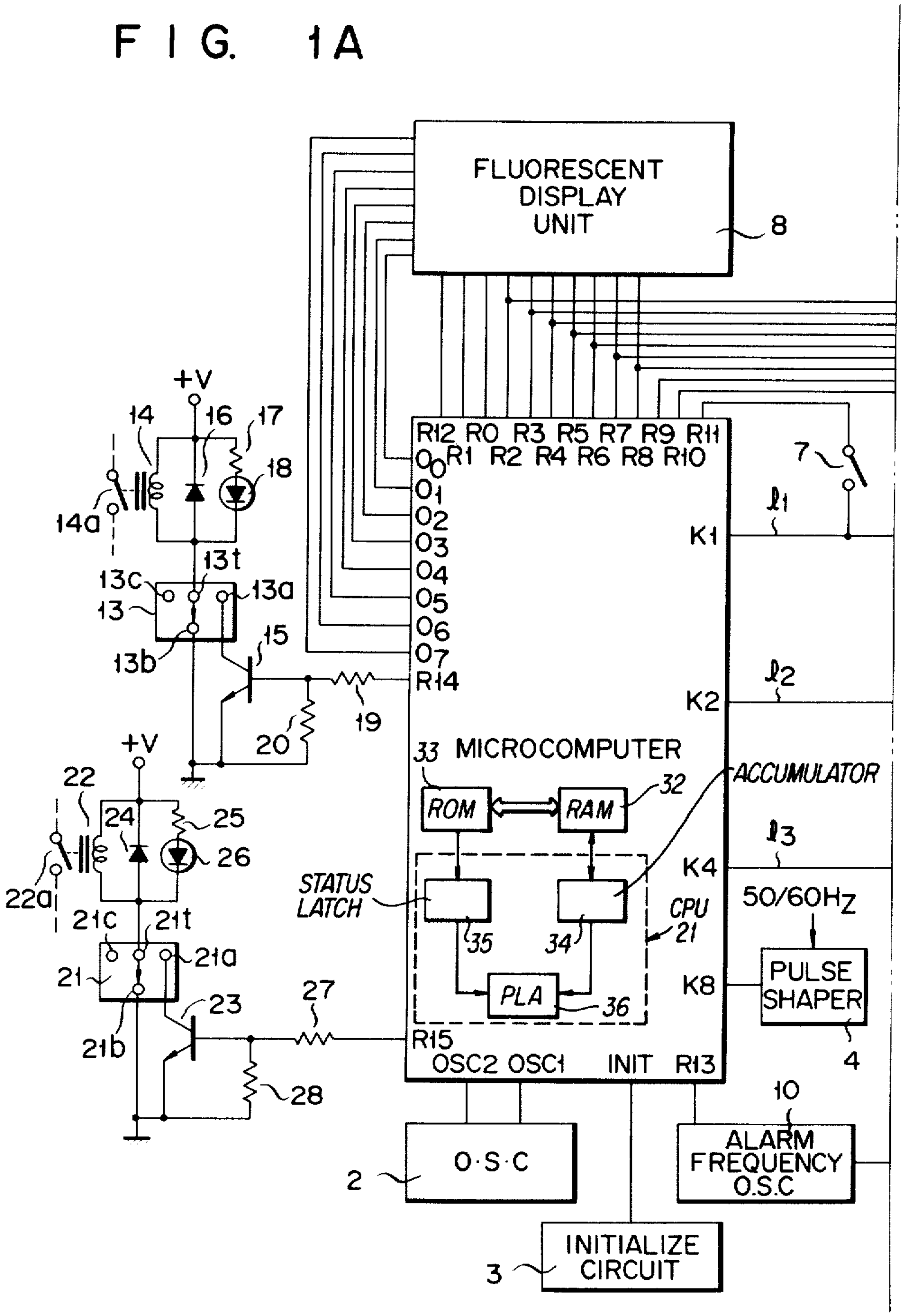
Figure 2:
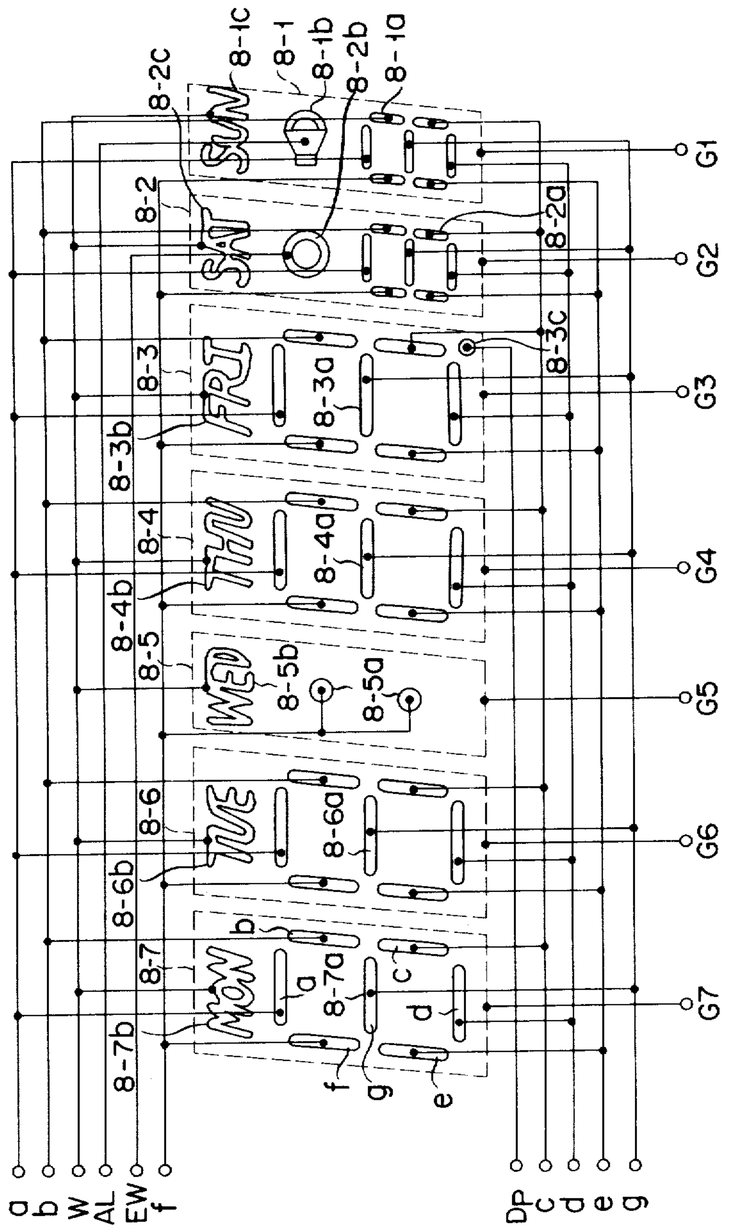
FIG. 2 shows a wiring diagram of a fluorescent display unit used in the timer shown in FIG. 1.

Electric Timer (FIGS. 1 and 2)

An electronic timer, which is an embodiment of the invention, will be described placing an emphasis on the overall circuit arrangement.

In FIG. 1, a one-chip microcomputer 1 of 4 bits is connected at the input terminals OSC1 and OSC2 to an oscillator 2 for obtaining clock signals for its basic operation. An initializing circuit 3, connected to the input terminal INIT of the microcomputer 1, causes the computer 1 to commence the execution of instructions from a specific instruction when a power source drives the overall system of the timer. The computer 1 has four-bit parallel input terminals K1, K2, K4 and K8, 8-bit parallel output terminals 00 to 07, and 16-bit output terminals R0 to R15 individually arranged for each bit. The input terminal K8 is connected to a wave shaper 4 for providing a time reference signal formed by wave-shaping a commercial frequency into a rectangular wave. Lines $l_1$ to $l_3$ connecting to the input terminals K1, K2 and K4 and lines $l_4$ to $l_{12}$ connecting to the output terminals R2 to R10 are combined to form a matrix circuit. The cross points of the matrix circuit have key switches corresponding to 26 keys such as "0/EW", "1/MON", "2/TUE", "3/WED", "4/THU", "5/FRI", "6/SAT", "7/SUN", "8/M~F", "9/M~S", "AM/11", "PM/12", "ON 1", "OFF 1", "ON 2", "OFF 2", "ALARM", "SNOOZE", "CLEAR", "INPUT", "STOP", "WEEK", "CALL", "SET", "TIME ADJ." and "CLOCK" as shown in the figure. Of those switches, "CALL", "SET", "TIME ADJ.", and "CLOCK" are mode switches in a mode selector 5. The remaining switches are used as a data/signal input section 6 for inputting data and signals such as timer data, clock data, clear signal, and transfer signal. A switch for switching between 50 and 60 Hz designated as 7 is inserted between the output terminal R11 and the input terminal K1. The output terminals R2 to R8 are connected to the grids of a fluorescent display unit 8. The output terminals 00 to 07 and the output terminals R0, R1 and R12 are connected to the segments of the fluorescent display unit 8, respectively.

As shown in FIG. 2, the fluorescent display unit 8 has a construction of 7 digits. A first digit display section 8-1 has seven numeral display segments generally designated by 8-1*a*, a sound mark segment 8-1*b*, and a Sunday display segment 8-*c*. A second digit display section 8-2 has seven numerical display segments 8-2*a*, an every-week operation mark display segment 8-2*b*, and a Saturday display segment 8-2*c*. A third digit display section 8-3 has seven numerical display segments 8-3*a*, a Friday display segment 8-3*b*, and a decimal point display segment 8-3*c*. A fourth digit display section 8-4 has seven numerical display segments 8-4*a*, and a Thursday display segment 8-4*b*. A fifth digit display section 8-5 has two colon display segments 8-5*a* and a Wednesday display segment 8-5*b*. A sixth digit display section 8-6 has seven numerical display elements 8-6*a*, and a Tuesday display segment 8-6*b*. A seventh digit display section 8-7 has seven numerical display segments 8-7*a* and a Monday display segment 8-7*b*. The respective digit display sections 8-1 to 8-7 are connected at the grids to digit terminals G1 to G7. In each digit display section 8-1 to 8-7, the segment a is connected to a terminal a; the segment b to a terminal b; the segment c to a terminal c; the segment d to a terminal d; the segment e to a terminal e; the segment f to a terminal f; the segment g to a terminal g. The two colon display segments are connected to the terminal f. The decimal display segment 8-3*c* is connected to a terminal Dp. The day-of-week display segments 8-1*c*, 8-2*c*, 8-3*b*, 8-4*b*, 8-5*b*, 8-6*b*, and 8-7*b* are connected to a terminal w. The sound display segment 8-1*b* is connected to a terminal AL. The every-week operation mark display segment 8-2*b* is connected to a terminal EW. The output terminals R2 to R8 of the microcomputer 1 are connected to the digit terminals G1 to G7, respectively. The output terminals 00 to 07 of the computer 1 are coupled with the terminals a to g and Dp, respectively. Similarly, the output terminal R0 is connected to the terminal AL; the output terminal R1 to the terminal EW; the output terminal R12 to the terminal w. With such a wiring, the fluorescent display unit 8 is dynamically displayed by the microcomputer 1. The output terminals R2 to R8 have diodes 9 with the polarity as shown to inhibit signals from sneaking from the key matrix to the fluorescent display section 8. The output terminal R13 of the computer 1 is connected to an input terminal of a sound frequency signal oscillator 10. The oscillator 10 oscillates when the output at the output terminal R13 is logical '1' and supplies the output signal through the sound switch 11 to a sound device 12. The sound switch 11 is of the three contact type. When a common contact 11*t* is in contact with a fixed contact 11*a*, the oscillating output is applied through a resistor 29 to the sound device 12. When the common contact 11*t* is connected to another fixed contact 11*b*, the oscillating output is directly applied to the sound device 12. Further, the common contact 11*t* is connected to a fixed contact 11*c*. At this time, it is inhibited that the oscillating output is applied to the sound device 12. In other words, the fixed point 11*a* is for a low sound output; the fixed point 11*b* is for a high sound output; the fixed contact 11*c* is for sound inhibition.

Reference numeral 13 designates a first power source switch of three-contact type having fixed contacts 13*a*, 13*b* and 13*c*, and a common contact 13*t* to be selectively connected to the three fixed contacts. The common contact 13*t* of the switch 13 is connected to +V terminal via a first relay coil 14. The fixed contact 13*a* is earthed through a first transistor 15 of NPN type. The fixed contact 13*b* is directly earthed. The fixed contact 13*c* is connected to nothing. A normally open contact 14*a* which is energized by the first relay coil 14 is inserted in a first power source outlet circuit (not shown). The first relay coil 14 is connected in parallel with a protective diode 16 and a series circuit having a resistor 17 and a photodiode 18. The base of the first transistor 15 is connected through a resistor 19 to the output terminal R14 of the microcomputer 1. A resistor 20 is inserted between the base and the emitter of the first transistor 15. A second power source switch 21 is of three-contact type having fixed contacts 21*a*, 21*b* and 21*c*, and a common contact 21*t* connecting to those fixed contacts 21*t*. The common contact 21*t* of the switch 21 is connected to +V terminal through a second relay coil 22. The fixed contact 21*a* is grounded via a second transistor 23 of NPN type. The fixed contact 21*b* is directly grounded. The fixed contact 21*c* is connected to nothing. A normally open contact 22*a* which is energized by the second relay coil 22 is inserted in a second power source outlet circuit (not shown). The second relay coil 22 is connected in parallel with a protective diode 24 and a series circuit having a resistor 25 and a light emission diode 26. The base of the second transistor 23 is connected through a resistor 27 to the output terminal R15 of the microcomputer 1. A resistor 28 is inserted between the base and emitter of the second transistor 23. In both the circuits, when the common contacts 13*t* and 21*t* of the power source switches 12 and 21 are connected to the fixed contacts 13*a* and 21*a*, respectively, the relay coils 14 and 22 are energized when logical '1' appears at the output terminals R14 and R15 to energize the transistors 15 and 23. When the common contacts 13*t* and 21*t* are connected to the fixed contacts 13*b* and 21*b*, respectively, the relay coils 14 and 22 are constantly energized. When the common contacts 13*t* and 21*t* are connected to the fixed points 13*c* and 21*c*, respectively, the relay coils 14 and 22 are sustained at the deenergized state. TMS1370 manufactured by Texas Instrument Inc., for example, may be used for the microcomputer 1. This microcomputer is constructed by one chip and has a read only memory (ROM) of 2K bytes and a random access memory (RAM) of 128 words. The RAM is addressed through a combination of an X register of 3 bits and a Y register of 4 bits. Each address is a memory of one word with four bits.

Construction of RAM

The memory construction of the RAM used in the microcomputer 1 will be described with reference to FIGS. 3 to 11. Each word stored in the RAM is generally expressed by M(X,Y) and the bit in the word also is generally expressed by M(X,Y)(b), wherein X=0, 1, . . . , 7, Y=0, 1, . . . , 15 and b=0, 1,2,3. As shown in FIG. 3, M(0,0) to M(0,8) in the memory locations of the RAM are used as an input/display buffer for storing temporarily data inputted from the data entry keys 6 and for displaying the contents of a clock counter to be described later and various data storing portions. M(0,9) serves as a flash mode memory portion for storing data 8 to activate a specific segment or segments of the display unit 8 in the flash mode. M(0,10) is used as a mode memory portion for storing a mode selecting state of the mode selector 5. M(0,11)(3)(2) is used as a counter controller; M(0,11)(2) as a memory portion for storing data to indicate if a second counter to be described later is counted up or not; M(0,11)(3) as a memory to store a state of the input terminal K8. M(0,12) is a routine control portion of a decimal counter to control sequentially switch states of the switches of the dynamic display of the fluorescent display unit 8, the selector 5, the data/-signal input portion 6, and the frequency switch 7. M(0,13) is a display mode memory for storing any one of display modes of nine display modes to be given later. M(0,14) is an input data memory portion for storing states of the input terminals K1, K2 and K4. M(0,15) is a first counter of a hexadecimal counter for counting pulses with the commercial power frequency inputted to the input terminal K8. M(1,0)(3)(2) serves as a sound (alarm) state memory portion; M(1,0)(2) as a memory for storing a sounding state; M(1,0)(3) as a memory for storing a snoozing state. M(1,14) is a snooze counter for counting the snoozing time. M(1,15) and M(1,1) to M(1,7) are all clock counters for counting time. M(1,8) to M(1,13) are second counters functioning as a stop watch. M(2,0) to M(2,6), M(3,0) to M(3,6), M(4,0) to M(4,6), M(5,0) to M(5,6), M(6,0) to M(6,6), M(7,0) to M(7,6), M(2,7) to M(2,13), M(3,7) to M(3,13), M(4,7) to M(4,13), M(5,7) to M(5,13), M(6,7) to M(6,13) and M(7,7) to M(7,13) are used as first to twelfth data storage. M(2,14)(3)(2) is a switching data memory portion, in which M(2,14)(3) is used as a memory portion for storing a state of power source switch 14*a*. When M(2,14)(3) is logical '1', the output terminal R14 is logical '1', while when it is logical '0', the output terminal R14 is logical '0'. M(2,14)(2) is used as a second switching state memory. When M(2,14)(3) is logical '1', the output terminal R15 is logical '1', and when the bit is logical '0', the output terminal R15 is logical '0'. M(2,14)(1)(0) and M(2,15) are comparison result memory portions. The portions store the data which is a result of the comparison of the contents of the clock counter with those of twelve data memory portions. If there is any data memory portion having the clock data coincident with that of the clock counter, it performs the following operations in accordance with the data of a controlled operation stored in that data memory portion. When the controlled operation is the snooze data, it sets logical '1' in M(2,14)(1). For the alarm data, it sets logical '1' in M(2,14)(0). For the data to turn on a first power source switch circuit (ON1), it sets logical '1' in M(2,15)(3). For the data to turn off the first power source switch circuit (OFF 1), it sets logic '1' in M(2,15)(2). For the data to turn on a second power source switch circuit (ON 2), it sets logical '1' in M(2,15)(1). And for the data to turn off the second power source inlet circuit (OFF 2), it sets logical '1' in M(2,15)(0). M(7,14) is a comparison control unit of a scale-of 12 counter. When it is checked whether the clock data in the clock counter and in each of the twelve data memory portions are coincident with each other every minute, the comparison control unit sequentially controls the comparison for the clock data coincidence check. When such comparisons of the clock data are all completed, the logical signals are set in the sounding state memory portion M(1,0)(3)(2) and the switching state memory portion M(2,14)(3)(2) in accordance with the contents of the comparison result memory portion. M(3,14) and M(3,15) form a key input control unit for preventing on-chattering or off-chattering in the key operation and the simultaneous key operations of two or more keys by means of software technique. M(5,14) and M(6,14) form a data setting control portion to control the setting of the data stored in M(0,0) to M(0,8) into one of the twelve data memory portions. M(5,15) and M(6,15) form a data display control portion to control the setting of the data of one of the twelve data memory portions into the display memory portion to display it by the display unit 8. The write and read of logical signals for those memory portions are controlled by the CPU 31 on the basis of the program set in the ROM 33.

When M(0,0) to M(0,8) serve as the display memory portions for the clock counter portions M(1,15), M(1,1) to M(1,7), M(0,0) and M(0,1) form a day-of-week display memory; M(0,0)(3) a Sunday display memory, M(0,0)(2) a Saturday display memory; M(0,0)(1) a Friday display memory; M(0,0)(0) a Wednesday display memory; M(0,1)(3) an every-week display memory; M(0,1)(2) a Thursday display memory; M(0,1)(1) a Tuesday display memory; M(0,1)(0) a Monday display memory as shown in FIG. 4. Depending on the day-of-week data in M(1,7) of the clock counter, logical '1' is set in the corresponding display memory. M(0,2) to M(0,8) form an clock data display memory; M(0,2) 1-second digit display memory; M(0,3) a 10-second digit display memory; M(0,4) 1-minute digit display memory; M(0,5) a 10-second display memory M(0,6) 1-hour digit display memory; M(0,7)(1)(0) a 10-hour digit display memory; M(0,7)(3) an A.M. display memory; M(0,7)(2) a P.M. display memory; M(0,8)(3) a colon display memory. 1-second data, 10-second data, 1-minute data, 10-minute data and 1-hour data stored in the clock counter are stored into M(0,2) to M(0,6), respectively. When the 10-hour data is stored in the clock counter, logical '1' is set in M(0,7)(1)(0). On the other hand, when such data is not contained therein, logical '0' is loaded thereinto. When the AM data is contained in the clock counter portion, logical '1' is loaded into M(0,7)(3). When the clock counter portion contains the PM data, logical '1' is loaded into the clock counter portion. M(0,7)(2) and logical '1' is set in M(0,8)(3).

When M(0,0) to M(0,8) serve as the display memory portions of the data memory portions, M(0,0) and M(0,1) form the day-of-week display memory like that of FIG. 4, as shown in FIG. 5. With respect to M(0,2), M(0,2)(1) forms a snooze display memory; M(0,2)(0) an alarm display memory. With respect to M(0,3), M(0,3) forms ON 1 display memory; M(0,3)(2) an OFF 1 display memory; M(0,3)(1) an ON 2 display memory; M(0,3)(0) an OFF 2 display memory. M(0,4), M(0,5), M(0,6), M(0,7) and M(0,8) form a 1-hour display memory like that shown in FIG. 4.

With respect to the clock counter M(1,15), M(1,1) to M(1,7), M(1,15)(2)(1)(0) form a 1/50 or 1/60-second digit counter; M(1,1) forms a 1/10 second digit counter as shown in FIG. 6; M(1,2) a 1-second digit counter; M(1,3)(2)(1)(0) a 10-second counter; M(1,4) a 1-minute digit counter; M(1,5)(2)(1)(0) a 10-minute digit counter; M(1,6) a 1-hour digit counter. Further, M(1,5)(3) forms an AM/PM memory; M(1,7)(2)(1)(0) a day-of-week memory. M(1,15)(2)(1)(0) serves as a scale of 5 counter when the power source frequency is 50 Hz. It also serves as a scale of 6 counter when the frequency is 60 Hz. M(1,1), M(1,2), M(1,4) serve as a scale of 10 counter; M(1,3)(2)(1)(0), and M(1,5)(2)(1)(0) a scale of 6 counter; M(1,6) a scale of 12 counter. In before noon, logical '1' is set in M(1,5)(3) while, in after noon, logical '0' is set therein. Depending on the binary data '1' or '0', M(1,7)(2)(1)(0) stores '1' for Monday, '2' for Tuesday, '3' for Wednesday, '4' for Thursday, '5' for Friday, '6' for Saturday and '7' for Sunday.

Figures 7, 8, 9:
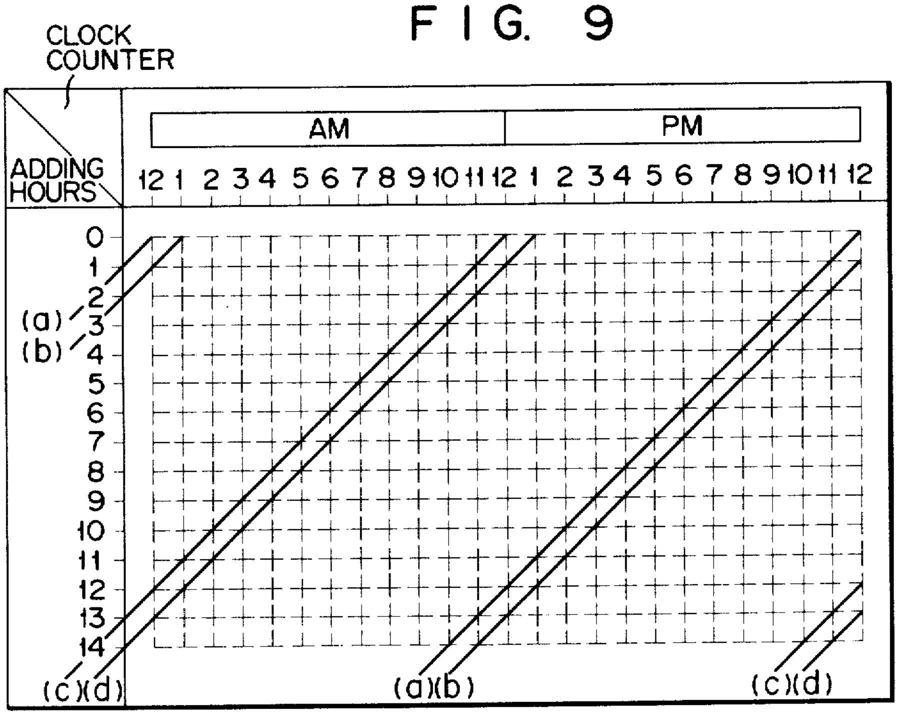
FIG. 7 shows the construction of a data memory portion in the RAM.
FIG. 8 shows the construction of a second clock counter in the RAM.
FIG. 9 diagrammatically illustrates how to perform the time addition.
Figure 10A:
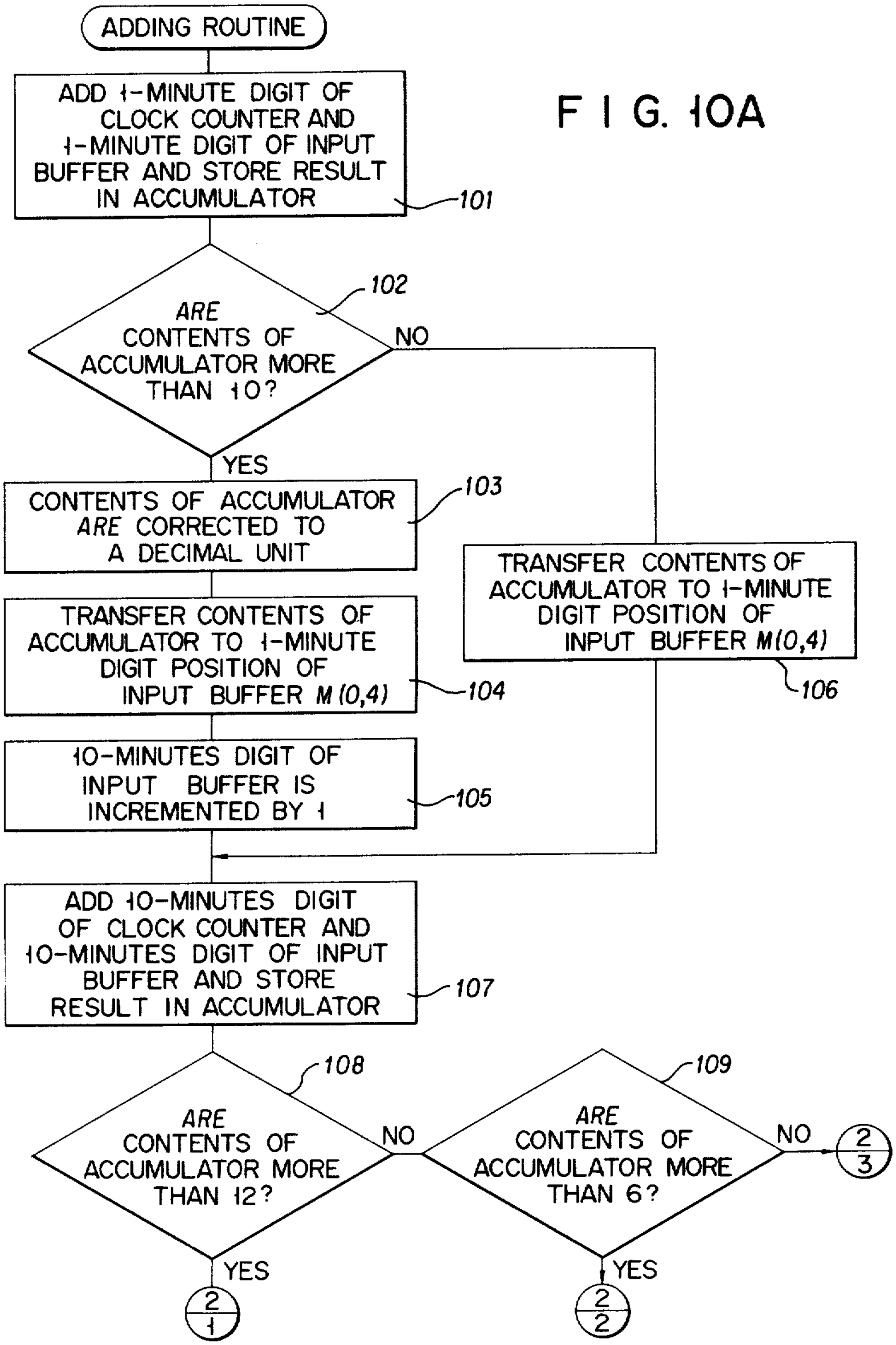
Figure 10B:
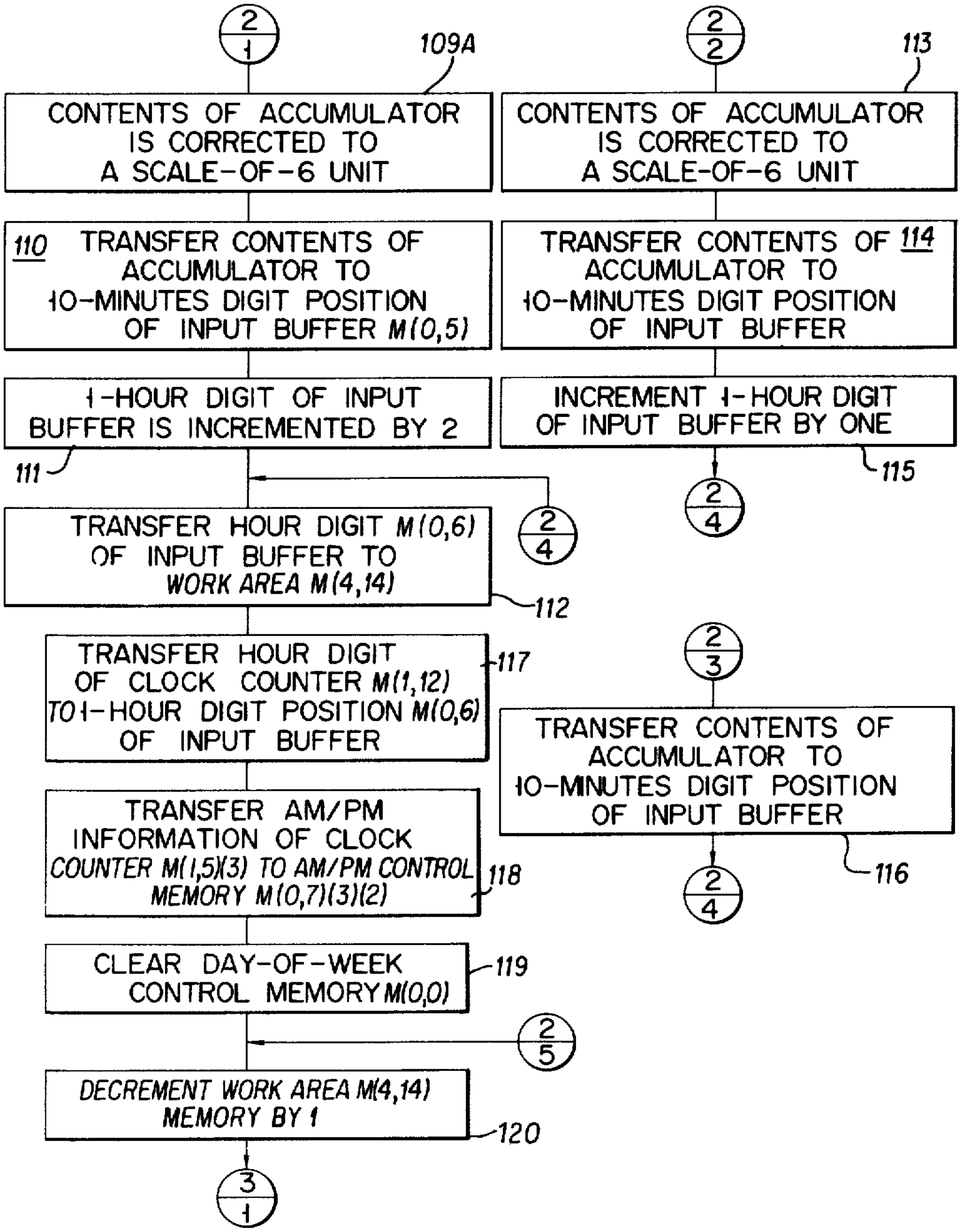
Figure 10D:
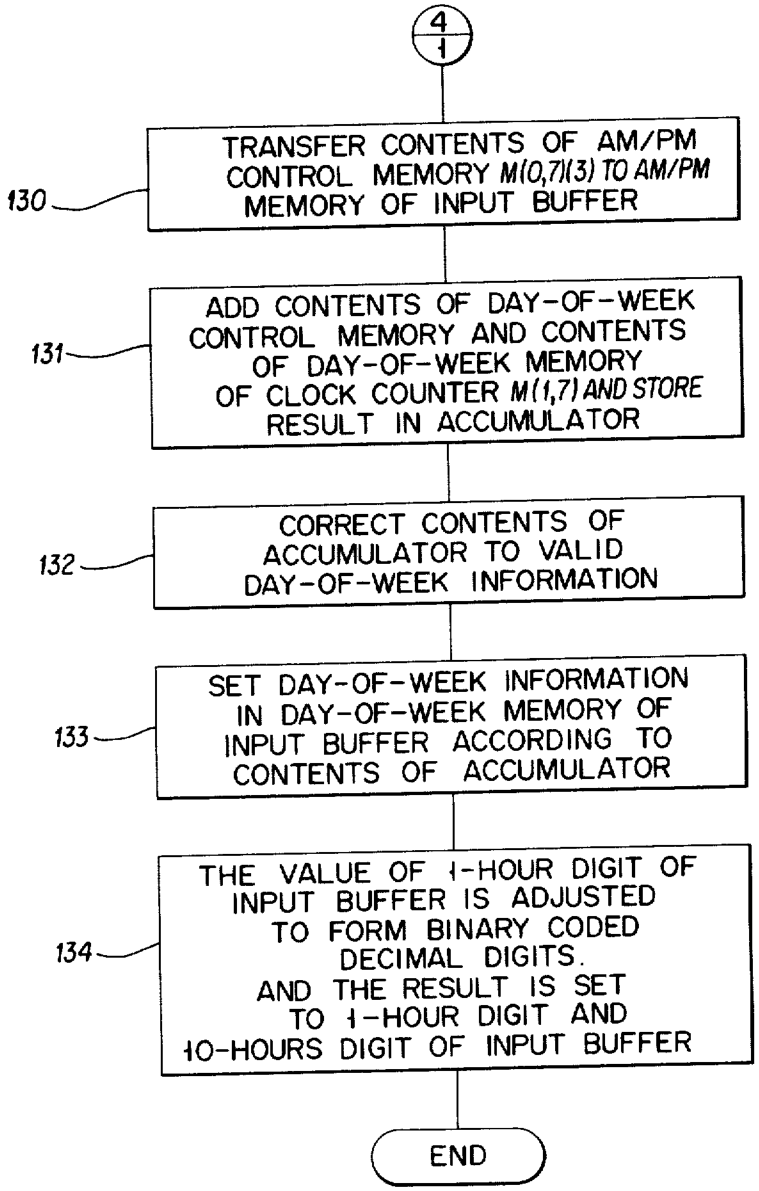

In the data memory portions M(2 to 7, 0 or 7) and M(2 to 7, 1 or 8) form a day-of-week data memory as shown in FIG. 7. Each of the day-of-week memory portion with the memory is mapped as shown in FIG. 5. With respect to M(2 to 7, 2 or 9), M(2 to 7, 2 or 9) is a snooze data memory; M(2 to 7, 2 or 9)(0) an alarm data memory. With respect to M(2 to 7, 3 or 10), M(2 to 7, 3 or 10)(3) an ON 1 data memory; M(2 to 7, 3 or 10)(2) an OFF 1 data memory; M(2 to 7, 3 or 10)(1) an ON 2 data memory; M(2 to 7, 3 or 10)(0) an OFF 2 data memory. M(2 to 7, 4 or 11) constitutes a 1-minute digit data memory; M(2 to 7, 5 or 12)(2)(1)(0) a 10-minute digit data memory; M(2 to 7, 6 or 13) a 1-hour digit data memory; M(2 to 7, 5 or 12)(3) an AM/PM data memory.

In the second counter M(1,8) to M(1, 13), M(1,8) constitutes a 1-second digit counter as shown in FIG. 8; M(1,9) a 10-second digit counter; M(1,10) a 1-minute digit counter; M(1,11) a 10-minute counter; M(1,12) a 1-hour digit counter; M(1,13) a 10-hour digit counter. M(1,8), M(1,10), M(1,12) and M(1,13) serve as a scale of 10 counter; M(1,9) and M(1,11) a scale of 6 counter. In other words, the second counter M(1,8) to M(1,13) form a counter for counting one second to 99 hours, 59 minutes and 59 seconds.

How to control the fluorescent display unit 8 by the microcomputer 1 will be described. The display pattern data toward the respective segment control terminals a to g and Dp of the display unit 8 are derived from the output terminals 00 to 07 of the microcomputer 1. The display pattern data are prepared by decoding the sum of four bits from the accumulator 34 and one bit from a status latch 35 in the microcomputer 1 by a program logic array. When the status latch is logical '0', the bit data is as shown in Table 1. When it is logical '1', the bit data is as shown in Table 2.

TABLE 1

| Decoder Input | Decoder Output | | | | | | | | Display |
|---|---|---|---|---|---|---|---|---|---|
| | a | b | c | d | e | f | g | Dp | |
| 0 0 0 0 | 1 | 1 | 1 | 1 | 1 | 1 | 0 | 1 | 0 |
| 0 0 0 1 | 0 | 1 | 1 | 0 | 0 | 0 | 0 | 1 | 1 |
| 0 0 1 0 | 1 | 1 | 0 | 1 | 1 | 0 | 1 | 1 | 2 |
| 0 0 1 1 | 1 | 1 | 1 | 1 | 0 | 0 | 1 | 1 | 3 |
| 0 1 0 0 | 0 | 1 | 1 | 0 | 0 | 1 | 1 | 1 | 4 |
| 0 1 0 1 | 1 | 0 | 1 | 1 | 0 | 1 | 1 | 1 | 5 |
| 0 1 1 0 | 1 | 0 | 1 | 1 | 1 | 1 | 1 | 1 | 6 |
| 0 1 1 1 | 1 | 1 | 1 | 0 | 0 | 1 | 0 | 1 | 7 |
| 1 0 0 0 | 1 | 1 | 1 | 1 | 1 | 1 | 1 | 1 | 8 |
| 1 0 0 1 | 1 | 1 | 1 | 1 | 0 | 1 | 1 | 1 | 9 |
| 1 0 1 0 | 1 | 1 | 1 | 0 | 1 | 1 | 1 | 0 | A |
| 1 0 1 1 | 0 | 1 | 1 | 1 | 1 | 1 | 0 | 0 | U |
| 1 1 0 0 | 1 | 0 | 0 | 1 | 1 | 1 | 0 | 0 | C |
| 1 1 0 1 | 0 | 0 | 0 | 0 | 0 | 0 | 0 | 0 | |
| 1 1 1 0 | 0 | 0 | 0 | 1 | 1 | 1 | 0 | 0 | L |
| 1 1 1 1 | 1 | 0 | 0 | 0 | 1 | 1 | 1 | 0 | F |

TABLE 2

| Decoder Input | Decoder Output a | b | c | d | e | f | g | Dp | Display |
|---|---|---|---|---|---|---|---|---|---|
| 0000 | 0 | 0 | 0 | 0 | 0 | 0 | 0 | 0 | 0 |
| 0001 | 0 | 0 | 1 | 0 | 0 | 0 | 0 | 0 | 1 |
| 0010 | 0 | 1 | 0 | 0 | 0 | 0 | 0 | 0 | 2 |
| 0011 | 0 | 1 | 1 | 0 | 0 | 0 | 0 | 0 | 3 |
| 0100 | 0 | 0 | 0 | 0 | 1 | 0 | 0 | 0 | 4 |
| 0101 | 0 | 0 | 1 | 0 | 1 | 0 | 0 | 0 | 5 |
| 0110 | 0 | 1 | 0 | 0 | 1 | 0 | 0 | 0 | 6 |
| 0111 | 0 | 1 | 1 | 0 | 1 | 0 | 0 | 0 | 7 |
| 1000 | 0 | 0 | 0 | 0 | 0 | 1 | 0 | 0 | 8 |
| 1001 | 0 | 0 | 1 | 0 | 0 | 1 | 0 | 0 | 9 |
| 1010 | 0 | 1 | 0 | 0 | 0 | 1 | 0 | 0 | A |
| 1011 | 0 | 1 | 1 | 0 | 0 | 1 | 0 | 0 | U |
| 1100 | 0 | 0 | 0 | 0 | 1 | 1 | 0 | 0 | C |
| 1101 | 0 | 0 | 1 | 0 | 1 | 1 | 0 | 0 | |
| 1110 | 0 | 1 | 0 | 0 | 1 | 1 | 0 | 0 | L |
| 1111 | 0 | 1 | 1 | 0 | 1 | 1 | 0 | 0 | F |

To be more specific, in the case of logical '0' in the status latch, when the contents of the accumulator is 9 (0000) to 9 (1001), the microcomputer 1 produces the display pattern data for displaying the corresponding numeral and decimal point. When the contents of the accumulator is (1010), it produces the display pattern data for displaying a character 'A'. For (1011) of the accumulator contents, the display pattern data outputted represents 'U'. For (1100), the display pattern data represents 'C'. For (1110), the pattern data represents 'L'. For (1111), the pattern data represents 'F'. For (1101), the pattern data represents nothing. When the status latch is logical '1', if the (0)th bit in the accumulator is logical '1', the segment c is energized for display. When the first bit is logical '1', the segment b is energized. The segment e is energized for logical '1' of the second bit. The segment f is energized for logical '1' of the third bit. That is to say, the microcomputer 1 produces the display pattern data so arranged that the respective bits of the accumulator, (0) to (3), correspond to the respective segments c, b, e and f in one-by-one corresponding manner, as mentioned above.

The explanation will be given of how to control the display unit 8 when the data stored in the clock counter is set in the display memory portions M(0,0) to M(0,8) of the RAM 32, as shown in FIG. 4. The control is successively made as follows: the data M(0,2) drives the digit G1; M(0,3) digit G2; M(0,4) digit G3; M(0,5) digit G4; M(0,6) digit G6; M(0,7) digit G7. At this time, of those the day-of-week display memory portion M(0,0) to M(0,1), the Monday display memory portion M(0,1) (0), for example, is logical '1'. If so done, logical '1' is produced at the output terminal R12 in energizing the digit G7 for display. In order to display the digits G7 and G5, logical '1' is stored in the status latch and the display control is performed as shown in Table 2. To display the respective digits G1 to G6, logical '0' is set in the status latch and the display control is performed as shown in Table 1. "before noon" is displayed by the segment f of the digit G7 while "after noon" by the segment e of the digit G7. Accordingly, when the display memory portion has the clock data "A.M. 12:25:34 on Monday", for example, the fluorescent display unit 8 displays

MON
'12:25.34

When the clock data is "P.M. 3:56:17 on Wednesday" it displays

WED
'3:56.17

The explanation will be made of how to control the display unit 8 when the data in data memory portion is stored in the display memory portions M(0,0) to M(0,8) of the RAM 32 in the form as shown in FIG. 5. The data of the portions M(0,0), M(0,1), M(0,4), M(0,5), M(0,6) and M(0,7) are all used in entirely the same as those when the clock data is displayed as mentioned above. The snooze data display data in the M(0,2) (1) is performed by the segment b of the digit G1. The alarm display data in the M(0,2) (0) is displayed by the segment c of the digit G1. ON 1 display data in the M(0,3) (3) is displayed by the segment f in the digit G2. The OFF 1 display data in the M(0,3) (2) is displayed by the segment e of the digit G2. The ON 2 display data in the M(0,3) (1) is displayed by the segment b of the digit G2. The OFF 2 display data in the M(0,3) (0) is displayed by the segment c in the digit G2. The data in the data memory portion is the timer data and accordingly, it is possible to set it to repeat the timer operation every week. Such a data setting is performed by setting logical '1' into the M(2 to 7, 1 or 8) (3). At this time, logical '1' is set in M(0,1) (3) of the display memory portion, accordingly. In such a case, logical '1' appears at the output terminal R1 when the digit G2 is energized. Therefore, when the display memory portion has the timer data to turn on the first power source inlet at P.M. 8:00 on Friday, the display of the fluorescent display unit 8 is

FRI.
'8:00.

When the timer data set therein is the one to turn on the second power source inlet circuit at P.M. 7:00 on Monday to Friday every week and to perform the snooze operation, the display is

MON TUE WED THU FRI
' 7 : 0 0. . "

In the timer device as an embodiment according to the invention thus far described, various controls may be made by means of four mode switches of the mode selector 5 and 22 keys of the data/signal input portion 6.

(1) Time Set Mode

This mode is for setting clock data in the clock counters M(1,15) and M(1,1) through M(1,7) in the form as shown in FIG. 6. The clock data is temporarily stored in the memory portions (input buffer) M(0,0) through M(0,8) and is set in the clock counters according to the transfer instruction.

(A) Operation of keys

When the "TIME ADJ." key if the mode selector 5 is operated to change the operation mode to the clock data set mode, the display unit 8 displays the following characters representing the address clock (this indicates that the data inputted to the input buffer is the clock data):

AC

Under this condition, the key operation sequence for setting the time to A.M. 10:08:15 on Monday, for example, is "1/MON", "0/EW", "0/EW", "8/M-F", "1/MON", "5/FRI", "AM/11", "WEEK", and "1/MON". Upon each of these key operations, the input clock data is sequencially displayed at the display unit 8. After completion of the key operation sequence the operator accordingly confirms if the display unit 8 displays

| |
|---|
| MON<br>'10:08.15 |

When the moment of the set time arrives, the clock data is transferred from the input buffer to the clock counter to be set therein upon depressing the "INPUT" key. When the display unit 8 displays

AC representing the address clock (indicating, in this case, that the clock data stored in the input buffer has been transferred to the clock counter), the setting of the clock data is completed. Since the clock data is temporarily stored in the input buffer, the key operation may be freely performed only if the proper sequence of the numeral keys is observed, the "WEEK" key is operated before the "1/MON" key for switching to the mode for designation of the day-of-week data, and the "INPUT" key is depressed last in the key operation procedure. Therefore, the key operation sequence may be "WEEK", "1/MON", "AM/11" "1/MON", "0/EW", "0/EW", "8/M-F", "1/MON", "5/FRI", and "INPUT"; or "1/MON", "WEEK", "1/MON", "0/EW", "0/EW", "8/M-F", "1/MON", "AM/11", "5/FRI", and "INPUT". If the operator fails to depress the "AM/11" key, for example, in the key operation sequence described above, the "AM" and "PM" segments of the display unit 8 flash. Similarly, when there is no designation of the day-of-week data or an impossible time is designated, the segments of all the days of the week and of the corresponding time are indicated by flashing.

(B) Functions of keys

In this mode, a "WEEK" key is used to invert the contents of M(0,8) (3). When it is logical '1', the colon segment of the digit G5 is energized for display. When it is logical '0', the colon segment is deenergized. "1/MON", "2/TUE", "3/WED", "4/THU", "5/FRI", "6/SAT" and "7/SUN" keys serve as the day-of-week designation keys to the days of the week from Monday to Sunday when M(0,8) (3) is logical '1'. Those keys also serve as entry keys to designate the numerals from 1 to 7 when M(0,8) (3) is logical '0'. When the respective keys are used as the day-of-week designation keys, logical '1' is set in the corresponding day-of-week memory portions M(0,0) and M(0,1) and logical '0' is set in the remaining ones, and further the corresponding day-of-week segments of the fluorescent display unit 8 are turned off. At this time, logical '0' is set in the M(0,8) (3) to deenergize the colon segment. The extinguishment of the colon segment indicates that, when the respective keys are operated, those are used as the entry keys to designate the numerals. This control is based on the fact that, in the setting of the clock data, only one kind of the day-of-week designation is performed. When the respective keys are used as the entry keys to designate the numerals, the entry data is set in the setting memory portion M(0,2). Upon this setting, the data having been set therein till then is transferred to M(0,3). Subsequently, the data transfer is made as follows: M(0,3)→M(0,4), M(0,4)→M(0,5), M(0,5)→M(0,6). When the data transferred from M(0,5) is 0, 1 or 2 in M(0,6) and the data previously set is 1, logical '1' is set in M(0,7) (1) (0) while logical '0' is set in M(0,7) (1) (0) in the remaining case. As a result, the data set in M(0,2) is displayed by the digit G1 8-1 for the second digit of the display, and the data previously displayed are transferred to the upper digits in the display by one digit. At this time, if the clock data more than or equal to 13:00 is displayed by the digits G7 8-7 and G6 8-6, the digit G7, i.e. the 10 hours digit display section, is extinguished. Keys "0/EW", "8/M to F" and "9/M to S" serve as the entry keys to designate the numerals for logical '1' or '0' of M(0,8) (3). When each of the keys is actuated, the contents of M(0,8) (3) is inverted to be logical '0' if the contents thereof is '1'. Of course, the data of each key is set in M(0,2). A key "AM/11" is for designating "before noon". When this key is depressed, logical '1' is set in M(0,7) (3), logical '0' is set in M(0,7) (2) and the segment f of the digit G7 8-7 is energized. A key "PM/12" is for designating "after noon". The depression of this key sets logical '0' to M(0,7) (3), logical '1' to M(0,7) (2) and energized the segment e of the digit G7 8-7. When M(0,8) (3) is logical '1', both the keys "AM/11" and "PM/12" invert the contents thereof to be logical '0' and distinguish the colon segment. A key "CLEAR" is used to erase the contents of the setting memory portions M(0,0) to M(0,8) when data is erroneously set therein. The depression of the "CLEAR" key sets logical '0' into M(0,0), M(0,1), M(0,2), M(0,3), M(0,8), '12' into M(0,4), '13' into M(0,5), '13' into M(0,6) and '10' into M(0,7). Further, with respect to M(0,2) to M(0,3) and M(0,8), it sets logical '1' into the status latch. With respect to M(0,4) to M(0,7), it sets logical '0' into the status latch. The former causes the display unit 8 to effect the display in accordance with Table 1. The latter causes it to effect the display in accordance with Table 2. Accordingly, the display at this time is

AC

This display control is performed similarly when the mode is switched from a mode to a clock set mode by the mode selector 5 thereby to indicate that the address becomes the clock in the contents. In the clock set mode, it must be determined which logical state of the status latch is used for the display mode. As described above, the display mode has the clock display mode and the address display mode. The display mode is stored in the display mode memory portion of M(0,13). When the mode in the mode memory portion of M(0,10) is different from the mode of the mode selector 5, that is to say, when the mode is changed from a mode to the clock set mode in the mode selector 5, and when the "CLEAR" key is operated, the display mode is set to the address display mode. In the address display mode, when keys "0/EW" to "9/M to S", "AM/11" and "PM/12" are operated, the display mode is set to the clock display mode. In this way, both the display modes may smoothly be performed. A key "STOP" to be described in detail later has the following functions. When M(1,0) (3) is '1', it sets logical '0' into M(1,0) (2) and it renders 0 the contents of M(1,14). When M(1,0) (3) is logical '0', it sets logical '0' to M(1,0) (2). In the clock set mode, keys "ON 1", "OFF 1", "ON 2", "OFF 2", "ALARM" and "SNOOZE" are idle. A key "INPUT" is a transfer key for transferring the clock data set in the set memory portions M(0,0) to M(0,8) to the clock counter portions M(1,15) and M(1,1) to M(1,7). When this key is depressed, if the contents of the set memory portion is correct as the clock data, the clock data is transferred to the clock counter, and M(1,14), M(1,15), M(1,0), M(1,1), and M(0,15) are cleared to have zero. The address display mode is further set in the display mode memory portion M(0,13), while the display mode is set in the set memory portions M(0,0) to M(0,8). In this way, "AC" is displayed by the display unit 8 to tell an operator that it is correctly set in the clock address. The reason why M(1,14) and M(1,0) are zeroed will be described later. The reason why M(1,15), M(1,1) and M(0,15) are zeroed and M(0,11) (3) is set to have logical '0' is to reset the counter having less than one second to have zero.

When the clock data set in the set memory portion is incorrect, the following operation will be performed. Firstly, when neither A.M. nor P.M. is designated, no designation of such is displayed by flashing. For example, when, in the address display mode, the key "INPUT" is depressed, the clock display mode is stored in the display mode memory portion. M(0,0), M(0,1) and M(0,7) are zeroed. Logical '0' is set in M(0,8) (3). 13 is loaded in M(0,2), M(0,3), M(0,4), M(0,5) and M(0,6). Then, no designation of P.M. or A.M. is displayed. This is displayed flashing the segments e and f of the digit G7 with intervals of 0.5 second. For the flashing operation, the flash mode memory portion of M(0,9) stores a value corresponding to the kind of the flashing, or the flashing mode of P.M. or A.M. in this case. By using the 1/10-second digit counter of M(1,1), the segments are deenergized when the count is 0 to 4 while those are energized when 5 to 9. At this time, the remaining segments are energized in accordance with the contents of the set memory. In the flashing, logical '0' is set in M(0,8) (3) and the colon segment is not energized. Then, when the key "AM/12" is depressed, the flashing operation stops and the control by both the above-mentioned keys is carried out. Secondly, when the day of the week is not designated, that is to say, when M(0,0) and M(0,1) are all logical '0', the day-of-week segments 8-7*b*, 8-6*b*, 8-5*b*, 8-4*b*, 8-3*b*, 8-2*c* and 8-1*c* are all flashed with intervals of 0.5 second. In this case, a value corresponding to the day-of-week flash mode is stored in the flash mode memory portion of M(0,9). Logical '1' is set in M(0,8) (3). Then, when the keys "1/MON", "2/TUE", "3/WED", "4/THU", "5/FRI", "6/SAT" or "7/SUN" are operated, these keys function as the day-of-week designation key. The flashing period is designated by M(1,1) as in the case of no designation of A.M. or P.M.. The remaining segments are displayed in accordance with the contents of the set memory portion. Thirdly, the numerical value is incorrect, the incorrect numerical value is flashed as it is. In the 12-hour display system, other numerals than those from 1h. 00m. 00s to 12h. 59m. 59s are insignificant. At this time, the M(0,8) (3) is set to have logical '0'. When the keys "1/MON" to "7/SUN" are depressed, those keys are used as entry keys. In this mode, the segments other than those are energized in accordance with the contents of the set memory portion.

(2) Timer Data Set Mode

In the timer data set mode, the timer data is temporarily stored in the set memory portion in the form shown in FIG. 5. After the operator confirms that this timer data is what is desired, it is transferred and set in one of the storages in the form shown in FIG. 7.

(A) Operation of keys

When the "SET" key of the mode selector 5 is depressed, the timer data set mode is entered wherein the smallest storage address among the empty storages is displayed at the display unit 8. When this address is "3", for example, the display would be

A 3

The timer data to be set may be the clock data for turning on a first power switch circuit at P.M. 3:00 on Tuesday, for example, or the time interval data for generating a warning sound 10 minutes after the present time. For setting the former data, the operator performs the key operation of "3/WED", "O/EW", "O/EW", "PM/12", "WEEK", "2/TUE", and "ON1". After the operator confirms that the display unit 8 displays

TUE
;3:00.;

the "INPUT" key may be depressed. Then, the display unit 8 displays the next address

A 4

(which indicates the fourth storage). The key operation may be random as in the case of the clock data set mode. For signaling erroneous operation, the functions of flashing of AM and PM, flashing of day-of-week, flashing of the time (as in the case of the clock data set mode) and the function of flashing of operation data (e.g., "ON1", "OFF1", and so on) are included. The clock data as the timer data is capable of designating a plurality of days of the week, every day operation, and every week operation. For example, for setting to turn on a second power switch circuit at P.M. 1:00 on Monday, Tuesday and Wednesday, the key operation may be "1/MON", "O/EW", "O/EW", "PM/12", "ON/2", "WEEK", "1/MON", "2/TUE", "3/WED", and "INPUT". For setting to turn on the first power switch circuit at P.M. 8:00 on Monday through Sunday, the key operation may be "8/M-F", "O/EW", "O/EW", "PM/12", "ON1", "WEEK", "9/M-S" and "INPUT". For setting the snooze operation at A.M. 7:20 of Monday through Friday for each week, the key operation may be "7/SUN", "2/TUE", "O/EW", "SNOOZE", "WEEK", "8/M-F", "O/EW", "AM/11", and "INPUT". A plurality of operation data may also be set.

Setting of the time interval data as the timer data will next be described. For example, for generating a warning sound 10 minutes after the current time, P.M. 4:13 of Monday, the key operation may be "1/MON", "O/EW", "ALARM", and "INPUT", and the display unit 8 then displays

| |
|---|
| SUN |
| ,4:23, |

When the "INPUT" key is reoperated after confirming this time, the data is set in the third storage when the address is "3". The display at the display unit 8 then becomes:

A 4 and the next address is displayed. The maximum time interval data which may be set is 12 hours and 99 minutes. When the timer data is set in all the 12 data storages in this manner, the display unit 8 displays

FULL

Then, keying in is ineffective and setting of new data is impossible so that erroneous deletion of the timer data which has been already set may be prevented.

(B) Function of keys

In this mode, when the mode is changed to the data set mode and the "CLEAR" key is operated in the mode selector 5, the following operations are performed in the timer set. The addresses in the twelve data memory portions where the timer data are not yet stored are searched by giving priority to the addresses of smaller numbers. The value corresponding to the address is set in the data set controller of M(5,14) and M(6,14). With respect to M(0,0) to M(0,8) of the set memory portion, zero is loaded into M(0,0), M(0,1), M(0,2) and M(0,3), 13 is loaded into M(0,6), 10 is loaded into M(0,7) and logical '0' is loaded into M(0,8)(3). When the address is 0 to 9, the address number is loaded into M(0,4) and 13 is loaded into M(0,5). When the address is 10 to 12, the address number is set in M(0,4) and M(0,5). For example, when the unloaded address is the address 1, the display unit 8 displays "A1". When it is the address 12, the display unit 8 displays "A12". At this time, the address display mode is stored in the display mode memory portion. The display mode in the data set mode has the address display mode mentioned above and the data display mode (See FIG. 5). The mode change from the address display mode to the data display mode is performed through the key operation as in the clock set mode mentioned above. In this case, the data display mode in place of the address display mode is stored in M(0,13). At this time, in the input buffer, M(0,0)=0, M(0,1)=0, M(0,2)=0, M(0,3)=0, M(0,4)=13, M(0,5)=13, M(0,6)=13, M(0,7)=0; logical '0' is set in M(0,8)(3). In this way, the timer is prepared for the setting of a new key data thereinto. In searching the unloaded data memory portion in the data set mode, when data are already set in all the twelve data memory portions, the following memory locations have numerals set as follows: M(0,4)=14; M(0,5)=14; M(0,6)=11; M(0,7)=15; M(3,15)(3)=logical '1'. As a result, the display unit 8 displays

FULL

The display FULL indicates all the data memory portions have data already stored therein. The logical '1' in M(3,15)(3) in the key input control section is the key input inhibit bit. When the key input inhibit bit is logical '1', all the key input operations are inhibited, so that, if a key is erroneously operated, the display unit 8 continues the display of FULL.

In the data set mode, the "CLEAR" key is used to erase the memory portion, as in the clock set mode mentioned above. The contents of the set memory portion and the display operation by the display unit 8, following the operation of the key, are as described above. The "WEEK" has a similar function to that in the clock set mode. The ten keys "O/EW", "1/MON", "2/TUE", "3/WED", "4/THU", "5/FRI", "6/SAT", "7/SUN", "8/M to F", and "9/M to S", serve as entry keys when logical "0" is set in M(0,8)(3) and the colon segment is extinguished. The numerals entered by the entry keys are set in M(0,4). The values stored till then in M(0,4) to M(0,6) are successively transferred to the upper counter as in the clock set mode. When, in M(0,6), the data transferred from M(0,5) is any one of 0,1 and 2, and the data previously set is 1, M(0,7)(1)(0) is set to have '1' while other remaining ones are set to have logical '0'. With such settings, a numeral newly set in M(0,4) is displayed at the minute digit display section of the digit G3. The numerals displayed till that time are shifted to upper digits by one digit. When the clock data more than or equal to 13:00 forward is displayed by the digits G7 and G6, the digit G7 is extinguished. Those ten keys act as the day-of-week designation keys when logical '1' is set in M(0,8)(3) and the colon segment is lighted. The keys "1/MON"to "7/SUN" correspond to Monday to Sunday, respectively. Logical '1' is set in the corresponding bits of M(0,0) and M(0,1) and the corresponding day-of-week segment of the display unit 8 is energized. Keys "8/M to F" correspond to Monday to Friday. Five bits (1) and (0) of M(0,0) and (2), (1) and (0) of M(0,1) are set to have logical "1". At the same time, the day-of-week keys from Sunday to Friday are energized. Keys "9/M to S" correspond to the days of the week from Monday to Sunday. The depressions of the bits (3), (2), (1) and (0) of M(0,0) and the bits (2),(1) and (0) of M(0,1) while at the same time it energizes all the day-of-week segments of the display unit 8. A key "0/EW" is an every-week designation key. The operation of the key sets logical "1" to M(0,1)(3) while at the same time it lights the everyweek operation mark segment 8-2*b*. The term "everyweek operation" means that a set of the timer operation of the day of the week is repeated every week. The timer address set without operating the key "O/EW" is cleared when the timer operation dependent on the timer data starts and it is reserved as the unloaded address. As will be recalled, in the clock set mode, when logical '1' is set in M(0,8)(3) and each key "1/MON" to "7/SUN" is operated, the key serves as the day-of-week key. Under this condition, when one of the keys is operated to designate a day of the week, logical "0" is set in M(0,8)(3) and then each of the keys is operated, the key to designate the numerals serves as the entry key. In the data set mode, a plurality of the day-of-week data may be set in one data memory portion, so that there is a possibility that two or more keys of those ten keys are successively operated. Therefore, the circuit is so designed that, if ten keys are successively depressed, M(0,8)(3) sustains logical "1" in the data set mode. However, when all the bits of M(0,0) and M(0,1) are logical '1' through the key operation, no further designation of the day of the week is made. Accordingly, at this time, M(0,8)(3) is set to have logical '0' and the ten keys serve as entry keys to designate the numerals when those are depressed afterwards. The key "AM/11" key, "PM/12" and "STOP" have the function like that in the clock set mode. Six keys "ON 1", "OFF 1", "ON 2", "OFF 2", "ALARM" and "SNOOZE" are used as keys for setting the data representing the operation of the item to be controlled. The operation of those keys set logical '0' to M(0,8)(3). When the key "ON 1" is depressed, logical '1' is set in M(0,3)(3); logical '0' in M(0,3)(2); the segment f of the digit G2 is energized; the segment e is extinguished. When the key "OFF 1" is depressed, logical '0' is set in M(0,3)(3); logical '1' in M(0,3)(2); the segment e of the digit G2 is energized; the segment f is extinguished. When the key "ON 2" is depressed, logical '1' is set in M(0,3)(1); logical '0' in M(0,3)(0); the segment b of the digit G2 is energized; the segment c is extinguished. And when the key "OFF 2" is depressed, logical '0' is set in M(0,3)(1); logical '1' in M(0,3) (0); the segment c of the digit G2 is energized; the segment b is extinguished. When the key "ALARM" is depressed, logical '0' is set in M(0,2)(1); logical '1' in M(0,2)(0); the segment c of the digit G1 is energized; the segment c is extinguished. When the key "SNOOZE" is depressed, logical '1' is set in M(0,2)(1); logical '0' in M(0,2)(0); the segment b of the digit G1 is energized; the segment c is extinguished.

The key "INPUT" has a more complicated function in this mode than it has in the clock set mode.

When the correct timer data is set in the set memory portion, the timer data is transferred to the data memory portion of the address stored in the data set control portion M(5,14) and M(6,14). As in the case where the mode is changed to the timer data set mode by the mode selector 5, the address to next be set is searched and the searched one is set in the data set control portion and at the same time to the set memory portion. Then, the address is displayed by the display unit 8 in the address display mode. Seeing this, an operator learns that the data is reliably stored in the data memory portion and further the address to next be set. When none of AM, PM and a day of the week is designated, this state is judged as "time interval designation". At this time, the time designated is added to the "clock data" of the clock counter. The added one is set in the set memory portion and is displayed by the display unit 8. In the processing, the parallel addition of 4 bits as the arithmetic operation is performed with respect to the 1-minute digit and the 10-minute digit. With respect to the 1-hour digit, a special operation is performed. The reason for this is that the result of the operation may affect the bits for designating the day-of-week, AM and PM. The time interval addable to the "clock data" in the clock counter is within 0 minute to 12 hours and 99 minutes (corresponding to 13:39). Accordingly, when the time interval added is 13:39, if there is a carry from the 10-minute digit, the adding numeral to the hour-digit is 14. In other words, the adding numeral to the hour-digit is 14 at the maximum. Therefore, the numerical value obtained when the parallel addition of 4 bits about the hour digit is performed is 1 to 26. When the result of the addition is 1 to 11, there is no change of AM, PM and the day-of-week. Accordingly, there is no problem in such a case. When it is 12 or more, various judgements are needed. For example, when it is 12, it must be judged if the A.M. or P.M. bits are changed depending on after or before 12:00 of the clock data in the clock counter. When P.M. is changed to A.M., the day-of-week data must be changed. When it is 13, the clock data is changed to be 1:00, while at the same time the change of A.M., P.M. or the day-of-week must be judged depending on whether the clock data in the clock counter is after or before 12:00. This is true for 14 and 15 of the result of the addition; for 14, the clock data is changed to 2:00 and for 15, the clock data is changed to 3:00. Further, since the parallel addition of 4 bits can process only 0 to 15, when it is 16 or more, the carry may occur in the execution of the parallel. The judgement must accordingly be made about a carry occurring in the execution of the parallel addition. A similar judgement is continued till 23. When the addition result is 24, if the hour in the clock counter is 12:00, A.M. or P.M. is changed, and the day-of-week is changed. If the clock data is 10:00 and 11:00, A.M. or P.M. is not changed and the day-of-week is changed. In the cases of 25 and 26, the clock data of 1:00 and 2:00 further must be changed. The process of the parallel addition as described above may be expressed by a graph in FIG. 9. In the graph, the area to the right of a line (a) indicates that P.M. is changed to A.M. and the day-of-week also is changed. Similarly, the area to the right of the line (b) indicates that 13:00 is changed to 1:00 and that the judgement must be made of the change of A.M., P.M. and the day-of-week. The area to the right of the line (c) indicates that the judgement must be made of the change of A.M. to P.M. and the day-of-week. A line (d) indicates that the judgement must be made of changing 13:00 to 1:00, and the change of A.M., P.M. and the day of week. When the data of the hour digit is processed through the parallel addition of 4 bits as described above, the judgement changes case by case. Therefore, the number of instructions loaded into ROM 33 becomes extremely large. This problem, however, may be solved in the following manner. When a numeral representing the time internal is added to a numeral of the hour digit data in the clock counter, 1 is successively added to the numeral of the hour digit data of the time counter while 1 is successively subtracted from the time interval numeral. With this addition, when the added hour digit numeral increases to reach 12, A.M. or P.M. is changed. At this time, if P.M. is changed to A.M., the day-of-week is changed, too. When the hour digit numeral becomes 13, it is merely changed to 1. In this way, the addition of the hour digit numeral continues until the time numeral becomes zero, through the related program.

Explanation to follow is for the control by the CPU when the incorrect timer data is set in the set memory portion. Firstly, the day-of-week is designated, and AM or PM is not designated. In this case, as in the clock set mode, the segments e and f of the digit G7 of the display unit 8 are flashed in the AM/PM flashing mode. Secondly, AM or PM is designated but the day-of-week is not designated. In this case, as in the clock set mode, the day-of-week segments of the display unit 8 are all flashed in the day-of-week flash mode. Further, logical '1' is set in M(0,8)(3). Thirdly, the clock data set is not in a range of 1:00 to 12:59. In this case, the display unit 8 is flashed in the clock data flash mode, as in the clock set mode and logical '0' is set in M(0,8)(3). Fourthly, the operation data of the item to be controlled is not specified. That is to say, logical '1' is not set in M(0,2)(1)(0) and M(0,3)(3)(2)(1)(0). In this case, the segments b and c of the digit G1 and the segments b c, e and f of the digit G2 are extinguished when M(1,1) is 0 to 4. When it is 5 to 9, it is flashed with intervals of 0.5 second. At this time, the operation flash mode is stored in the flash mode memory portion of M(0,9).

(3) Clock Display Mode

In this mode, the display unit 8 displays the contents of the clock counters M(1,0)(1)(0), M(1,1) through M(1,7) and the second counter M(1,8) through M(1,13).

(A) Operation of keys

When the "CLOCK" key of the mode selector 5 is operated, the clock display mode is entered wherein the current time is displayed at the display unit 8. For example, when it is A.M. 10:12:23 on Monday, the display would be

| |
|---|
| MON<br>'10:12.23 |

When the "WEEK" key is depressed during display of the current time, the display unit 8 displays the contents (stopwatch) of the second counter M(1,8) through M(1,13). The second counter counts the time up to 99 hours, 59 minutes, and 59 seconds. When the "WEEK" key is depressed as the contents of the second counter M(1,8) through M(1,13) are being displayed, the current time is displayed.

When the "INPUT" key is depressed as the current time or the contents of the second counter are being displayed, the second counter starts counting. This counting operation is stopped by operating the "STOP" key while the contents of the second counter are being displayed. When the "CLEAR" key is operated as the contents of the second counter are being displayed, the contents of the second counter are reset and the display unit 8 displays 0.00

Even when the "WEEK" key is depressed as the contents of the second counters are being displayed to switch to display of the current time, the counting operation of the second counter continues. When the "WEEK" key is depressed to switch to the display of the current time after the counting of the second counter has been stopped by depressing the "STOP" key, the counting of the second counter remains stopped.

(B) Functions of keys

Figures 11, 12:
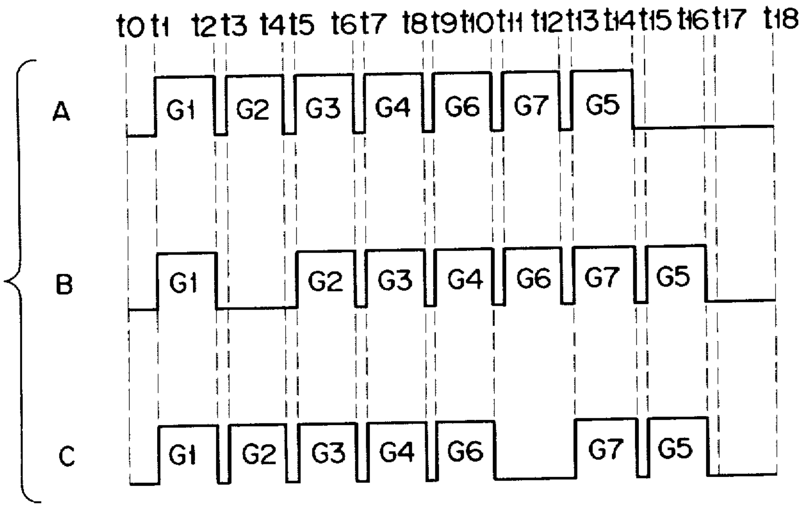
FIG. 11 shows the construction of the input/display buffer when it is storing the data in the second clock counter.
FIG. 12 shows a time chart useful in explaining a display control by the fluorescent display unit in which A is for the display control according to the invention and B and C are for that of the conventional one.

This mode is selected by means of the "CLOCK" key in the mode selector 5. When a mode is changed to the clock display mode in the mode selector 5, the contents of the clock counter is transferred to the display memory portion (using entirely the same memory portion as that of the set memory portion). Logical '1' is set in M(0,8)(3). The clock display mode is stored in the display mode memory portion M(0,13) and is displayed by the display unit 8. When M(0,8)(3) is logical '1', the depression of the key "WEEK" inverts the contents of M(0,8)(3) to be logical '0'. At the same time, it transfers the contents of the second counter to the display memory portion and displays it by the display unit 8. The contents of the second counter transferred to the display memory portion of M(0,0) to M(0,8) is as shown in FIG. 11. Specifically, logical '0' is set in all bits of the day-of-week memory of M(0,0) and M(0,1) and the colon display memory of M(0,8)(3) and M(0,2) to M(0,7) serve as the display memories of the 1-second digit, the 10-second digit, the 1-minute digit, the 10-minute digit, respectively, the 1-hour digit and the 10-hour digit. In displaying the contents of the second counter, particularly when all the digits of the 10-minute and more are zero, 13 is set in all those digits. In the second counter display mode, the digits G1 to G7 are displayed in accordance with Table 1 for '0' of the status latch. The digit G5 is displayed in accordance with Table 2 for '1' of the status latch. Accordingly, when the digits higher than the 10-minute digit are all zero, the display unit 8 is in a zero suppress mode for suppressing the displays at all the 10-minute and higher digits of the display unit 8. When M(0,8)(3) is logical '0', if the "WEEK" key is operated, the contents of M(0,8)(3) is inverted to be logical '1'. The contents of the clock counter is transferred to the display memory portion. The clock display mode is loaded into M(0,13) and is displayed by the display unit 8. The colon segment is energized in the clock display mode while it is deenergized in the second counter display mode. Therefore, seeing the colon segment, an operator can know the clock display mode or the second counter display mode. When M(0,8)(3) is logical '1' if the "INPUT" key is operated, the contents of M(0,8)(3) is inverted to be logical '0' and the contents of the second counter is displayed as in the depression of the "WEEK" key. In the operation of the "INPUT" key, logical '1' is loaded into M(0,11)(2). The M(0,11)(2) is the control bit of the second counter. When it is logical '1', the second counter performs its counting operation. When it is logical '0', the second counter stops its counting operation. Therefore, in the clock counter display mode, when the "INPUT" key is depressed, the display unit displays the contents of the second counter. At this time, if the second counter stops its operation, it starts the counting operation. If the second counter is counting, it continues the counting operation. Conversely, when M(0,8)(3) is logical '0', if the "INPUT" key is operated, the contents of M(0,11)(2) is inverted. When the second counter is counting, the first "INPUT" key operation makes the second counter start counting while, when the second counter stops its counting, the second "INPUT" key operation makes it restart its counting. The depression of the key "CLEAR" clears the second counter when M(0,8)(3) is logical '0', renders the contents of M(0,11)(2) logical '0' and causes the display unit 8 to display "0.00". The operation of the "CLEAR" key is insignificant when M(0,8)(3) is logical '1'. The key "STOP" has the same function as that in the clock data set mode. The keys "ON 1", "OFF 1", "ON 2" and "OFF 2" control the setting of logical '0' or '1' into the switch state memory portion. When the key "ON 1" is operated, M(2,14)(3) is set to have logical '1' to provide logical '1' at the output terminal R14. At this time, when the first power source switch 13 has connected the common contact 13*t* to the fixed contact 13*a*, the first transistor 15 is turned on to energize the first relay coil 14 and to close the normally open contact 14*a*, thereby to allow the current passage in the first power source inlet circuit. Further, the light emission diode 18 is driven to display to that effect. When the key "OFF 1" is operated, M(2,14)(3) is set to have logical '0' and logical '0' is applied to the output terminal R14. The inverse operation to that when the key "ON 1" is depressed, the current passage in the first power source inlet circuit is stopped and the driving of the light emitting diode 18 is stopped. When the key "ON 2" is operated, logical '1' is set to M(2,14)(2) and is applied to the output terminal R15. At this time, if the second power source switch has connected the common contact **21*t* to the fixed contact 21*a*, the second transistor 23 is turned on to energize the second coil to close the normally open contact 22*a* thereby to allow the current passage in the second power source circuit. Further, the light emitting diode 26 is driven to display to that effect. When the key "OFF 2" is operated, M(2,14)(2) is set to have logical '0' and the output terminal R15 has logical '0', so that the inverse operation to that when the "ON 2" key is operated and the current passage of the second power source inlet circuit is stopped and the light emitting diode 26** is deenergized. Note here that, if the keys other than the above-mentioned keys are depressed, the depression of the keys provides nothing in the circuit operation.

(4) Data Call Mode

This mode is for display at the display unit 8 of the contents of the 12 storages for the purpose of confirmation or deletion of these contents.

(A) Operation of keys when the "CALL" key of the mode selector 5 is operated, the data call mode is entered wherein the following characters are displayed at the display unit 8, which represents that the mode of operation is the data call mode:

CALL

For example, for confirming the contents of the first storage M(2,0) through M(2,6), the "1/MON" key is depressed. While this key is kept depressed, the following characters remain displayed:

A1.

When this key is released, the contents of the first storage are displayed. For example, if the data for turning on the first power switch circuit at P.M. 3:00 on Tuesday has been set, the following is displayed:

| |
|---|
| TUE<br>,3:00 |

When the contents of the first storage are no longer necessary after the confirmation, the contents of the first storage may be deleted by depressing the "CLEAR" key, and the following characters are displayed at the display unit 8 again:

CALL

For deleting the contents of all of the 12 storages, the "CLEAR" key may be depressed when the characters "CALL" described above are displayed at the display unit 8. Then, the display unit 8 displays the following characters:

ALL

When the operator depresses the "CLEAR" key again, the display unit 8 displays the characters "CALL" described above to indicate that the contents of all of the 12 storages have been deleted. The mode is set by means of the "CALL" key in the mode selector 5. In this mode, when a mode is changed to the data call mode by the mode selector 5, the following memory settings are made: M(0,0)=0, M(0,1)=0, M(0,2)=0, M(0,3)=0, M(0,4)=14, M(0,5)=14, M(0,6)=10, and M(0,7)=12, and M(0,8)(3) is logical '0'. Further, the data call mode is set in the display mode memory portion of M(0,13). As in the address display mode, the display in those mode of M(0,2), M(0,3) and M(0,8) is made in accordance with Table 2 for '1' of the status latch. The display of M(0,4), M(0,5), M(0,6), and M(0,7) is made in accordance with Table 1 for logical '0' of the status latch. Accordingly, the display of the display 8 is

CALL

By seeing this, an operator learns the timer is now in the data call mode. In this mode, the keys "1/MON" to "9/M to S" correspond to the first to ninth data memory portions, respectively; the key "0/EW" to the 10th data memory portion; the key "AM/11" to the 11th data memory portion; the key "PM/12" to the 12th data memory portion. When each of those key is depressed, a numeral of a value entered in the address display mode is displayed during the operated period as in the previous case where the above-mentioned mode is changed to the data set mode. As will be recalled, in the data set mode, the address is set in the data set control section of M(5,14) and M(6,14). In the present mode, however, it is loaded into the data display controller of M(5,15) and M(6,15). When the key "1/MON" is depressed, for example, the display unit 8 displays "A1" to indicate that the address is No. 1. Under this condition, if the key is released, that is to say, if the data display control section of M(3,14) and M(3,15) judges that the key is released when the address display mode is stored in M(0,13), the contents of the addresss is transferred to the display memory in the form of FIG. 5. At this time, logical '1' is set in M(O,8)(3). The data display mode like the data set mode is stored in the display mode memory portion of M(0,13). At this time, when the first data memory portion stores the timer data to turn on the first power source inlet at PM 3:15 on Monday, Wednesday and Friday, the display by the display control unit is

| | | |
|---|---|---|
| MON | WED | FRI |
| , | 3 | 15.' |

Under this condition, if the key "CLEAR" is depressed, the contents of the first data memory portion which is now displayed is erased. In other words, the data memory portion of the address is erased in accordance with the address of the data display control section. Following the erasure, the contents of the erased data memory section is displayed in the form of ":0" in the data display mode.

As described above, in this mode, by depressing one of the twelve keys corresponding to the data memory portions, the address of the address display portion corresponding to it is displayed. When the key is released, the contents of the data memory portion of the address is displayed. Under this condition, if the key "CLEAR" is operated, the contents of the data memory portion is erased and the erasure is displayed.

In the data call display mode, the key "CLEAR" is depressed, and all data call display modes are stored in the display mode memory portion of M(0,13) and 13 is set in M(0,7). The status latch in the all data call display mode is used as in the data call display mode. Accordingly, the display in this mode is

ALL

This display indicates that all the twelve data memory portions are designated. In the all data call display mode, if the key "CLEAR" is depressed, all the contents of the twelve data memory portions are erased and the data call display mode is stored in M(0,13) again and the display is "CALL". In this way, the data call display mode and the all data call display mode may be distinctively used by merely changing the value of M(0,7). Further, those may be displayed in the same manner. The "STOP" sets the sounding state memory portion of M(1,0)(3)(2) to logical '0', zeroes the contents of the snooze counter of M(1,14), and set the output terminal R13 to logical '0'. In the data call mode, the remaining keys "ON 1", "OFF 1", "ON 2", "OFF 2", "ALARM", "SNOOZE", "INPUT" and "WEEK" are idle.

(5) Power Down Display

The time device thus constructed operates in the following manner when the power down is recovered. When the power source has recovered from the power down, the four-digit numeral shown below is flashed at a frequency of once per second:

00 00.

Simultaneously with this flashing, the segment as denoted by 8-lb comes on. After 5 minutes has elapsed since the power down, a warning sound as in the case of the snooze alarm is generated. When this flashing is performed in the "Clock Set Mode", "Timer Data Set Mode", or "Data Call Mode" all the keys of the "Clock Set Mode", "Timer Data Set Mode", or "Data Call Mode", become invalid.

When any one of the 22 keys is depressed in the "Time ADJ." mode, the flashing is stopped and each key can then function as usual. The recovery from the power down is first displayed at the display. If this is not noticed and no action has been taken, a warning sound is generated. If the operator is absent, for example, and does not notice this, the warning sound stops after 3 minutes (flashing display is continued). This warning sound is distinguishable from the usual alarm sound without confirming the display after the warning sound stops. Since the mode is usually the "Clock Set Mode" and the warning sound is generated even when the alarm stop button is operated, this warning sound is distinguishable from the alarm sound and signals the necessity of resetting. Due to this construction, even in case of the power down while the operator is asleep, the operator will not oversleep without noticing that there has been a power down. When the power source is recovered, the initialize circuit 3 reads out a program in a specific address in ROM 33 and the CPU 21 starts the execution of a necessary job under control of the program read out. Firstly, all the contents of the RAM 32 are erased. Then, logical '1' is set in M(3,15)(3) to inhibit all the key inputs. In order to inform the power down after five minutes, logical '1' is set in the snoozing state memory portion of M(1,0)(3). The power down flash mode is stored in the flash mode storage of M(0,9) and the power down display mode is stored in the display mode memory portion of M(0,13). Then, the CPU 21 enters a normal routine in the program execution. The reason why logical '1' is set in M(3,15)(3) is that, unless the clock set mode is selected in the mode selector 5 in the power down display mode, all the key inputs must be made void. Let us consider a case where, when the timer is used as an alarm clock in the clock display mode, the power down occurs and then the power is recovered. When the sound device 12 is operated to recover the power down, even if the "STOP" key is depressed, the key input of the "STOP" key is made invalid so as not to stop the sounding operation, so that the timer tells an operator that the timer sounding is not for the alarm at the set time but for the power down recovery. At the power down, all the contents of the data memory portions and the contents of the clock counter as well are erased. Therefore, in order to operate the timer device as the timer, the clock data must first be set in the timer. It is for this reason that the key input are invalid in other modes than the clock set mode.

To be more specific, in the power down display mode, when the clock set mode is selected in the mode selector 5, logical '1' is set in M(3,15)(3) thereby to allow the key inputting. Under this condition, when a key input comes in, a non-flash mode is stored in the flash mode memory portion of M(0,9) and then the CPU operates in a normal mode (when no power down occurs) in a similar manner to that when the clock set mode is selected in the mode selector 5. Following this, the CPU operates in accordance with the key input. When no key input comes in in the clock set mode and another mode is then selected in the mode selector 5, logical '1' is again set in M(3,15)(3) and the CPU is locked in the key-input inhibition mode. In the power down display mode, M(0,0) to M(0,8) are all zero, the digits of G, G2 and G5 are energized in accordance with Table 2 for '1' of the status latch, for 0.5 second. The digits G3, G4, G6 and G7 are energized for 0.5 second in accordance with Table 1 for logical '0' of the status latch. The remaining 0.5 second has no display. Accordingly, the display unit 8 displays following with 0.5 second intervals 00 00

At this time, logical '1' is stored in the snooze memory portion of M(1,0)(3), so that the output terminal R0 has logical '1' to energize the sound display segment 8-lb.

(b) Others

The timer device thus constructed operates in the following manner with the reference of a commercial power source frequency pulse coming through the input terminal K8.

The clock counter counts the hour with the reference of the pulse. In the counting operation, when a carry is applied from the 10-second digit counter of M(1,3)(2)(1)(0) to the minute digit counter of M(1,4), the clock data in the clock counter is successively compared with that in each of the twelve data memory portions. In the comparison, when the clock data in the clock counter is coincident with that in the first data memory portion of M(2,0) to M(2,6), the result of the comparison is set in the comparison result memory portions of M(2,14) (1)(0) and M(2,15) in accordance with the operation data of the item to be controlled in the first data memory portion. For example, when M(2,2)(1) is logical '1', logical '1' is set in M(2,14)(1).

When M(2,2)(0) is logical '1', logical '1' is set in M(2,14)(0). When M(2,3)(3) is logical '1', logical '1' is set in M(2,15)(3). When M(2,3)(2) is logical '1', logical '1' is is set in M(2,15)(2). When M(2,3)(1) is logical '1', logical '1' is set in M(2,15)(1). When M(2,3)(0) is logical '1', logical '1' is set in M(2,15)(0). When logical '1' is set in M(2,1)(3), this indicates the every week operation. Accordingly, the contents of M(2,1)(2)(1)(0) and M(2,0) are left unchanged and the operation of the CPU enters the comparison of the hour data in the clock counter with that in the second data memory portion. The logical '1' stored in M(2,1)(3) indicates the timer operation every week. In this case, one of M(2,1)(2)(1)(0) and M(2,0) is accordingly inverted to have logical '0'. As a result, if all the bits of M(2,0)(3)(2)(1)(0), and M(2,1)(2)(1)(0) are logical '0', the comparison of the clock data in the clock counter with that in the second data memory portion is performed after the timer data in the first data memory portion is erased. If logical '1' still remains in any one of the bits of M(2,0)(3)(2)(1)(0) and M(2,1)(2)(1)(0), that comparison is directly executed without erasing the timer data in the first data memory portion. As the clock data comparisons of all the twelve data storages are respectively completed, the item to be controlled starts its operation in accordance with the contents of the comparison result memory portions M(2,14)(1)(0) and M(2,15)(3)(2)(1)(0). If M(2,14)(1) is logical '1', the snooze operation is performed regardless of the logical value in M(2,14)(0). In the snooze operation, if any other mode than the data call mode is selected in the mode selector 5, the operation of the sound device 12 is immediately stopped by means of the key "STOP" and after five minutes the sound device 12 starts its operation again. It is only when the sounding continues for three minutes that the snooze operation is completely stopped. The reason for this is that, when an operator is absent, the sound device 12 sounds uselessly. When the data call mode is selected by the mode selector 5, the sound device 12 is completely stopped by the "STOP" key to never start its operation again. Thus, the snooze mode is used for the purpose of alarm. In this mode, even if an operator operates the "STOP" key, the sounding is repeated every five minutes automatically. In such a case, to stop completely the sounding, the operator can stop it by merely operating the "STOP" key after the mode selector 5 is set to the data display mode. The time counting of the three-minute sounding and five-minute interval are made by the snooze counter M(1,14). When M(2,14)(1) is logical '1', logical '1' is set in M(1,0)(3)(2) and 5 is set in M(1,14). When the snooze state memory portion M(1,0)(3) is logical '1', logical '1' is set to the output terminal R0 to energize the sound display segment 8-lb. When M(1,0)(2) is logical '1', the sound device 12 is operated. In any other mode than the data display mode, the "STOP" key is operated, the contents of M(1,0)(2) is set to logical '0' to stop the sounding and the contents of M(1,14) is set to zero. M(1,14) is counted up one by one every minute. When the count reaches 5, logical '1' is set to M(1,0)(2) to restart the sounding. Under this condition, if the "STOP" key is not operated, the contents of M(1,14) is counted up every minute to increase 6, 7. When it reaches 8, the bit contents of M(1,0)(3)(2) are inverted to be logical '0' to completely stop the sounding operation. Further, if the "STOP" key is operated in the data display mode, M(1,0)(3)(2) has logical '0' and the contents of M(1,14) is set to zero to completely stop the sounding. Also at the power down recovery, M(1,0)(3) becomes logical '1' and M(1,14) becomes logical '0' as in the case where the "STOP" key is operated in the snooze operation mode. This means that at the power stoppage recovery, the sounding restarts after five minutes. Further, in the snooze mode, a state of M(1,0)(3) is displayed by the sound display segment 8-lb. This is done to tell an operator that the sounding restarts within five minutes.

When M(2,14)(1) is logical '0' and M(2,14)(0) is logical '1', an alarm operation is performed. In the alarm operation mode, the sounding is completely stopped when the "STOP" key is operated even if the mode selector 5 is set to any mode, further even if "STOP" key is not operated, the sounding is stopped within five-minute continuation. In the alarm mode, the contents of only M(1,2)(0) is set to logical '1' and M(1,0)(2) is inverted to have logical '0' by operating the "STOP" key. When M(1,0)(3) is logical '0' and M(1,0)(2) is logical '1', if the second digit counter M(1,2) of the clock counter is 5, the M(1,0)(2) is inverted to have logical '0'. Even when M(2,14)(1) is logical '0' and M(2,14)(0) is logical '1', if M(1,0)(3) is logical '1', the CPU enters the execution of the snooze operation and not the alarm operation.

When M(1,0)(2) is logical '1', the sound device 12 is controlled in a manner that, when 1/10-second digit counter of M(1,1) is 0 to 4, the output terminal R13 to logical '1' and when it is 5 to 9, the output terminal R13 to logical '0' thereby to operate the sound frequency oscillator 10. In this case, the sound device 12 is driven with intervals of 0.5 second.

In the ON and OFF control dependent on the contents of the comparison result memory portion, when M(2,15)(2) is logical '1', logical '0' is set to M(2,14)(3) regardless of the logical value of M(2,15)(3) and logical '1' is set to M(2,14)(3) if M(2,15)(2) is logical '0' and M(2,14)(3) is logical '1'. This means that, in the ON and OFF control of the first power switch circuit, the OFF operation has always priority over the ON operation. When M(2,14)(3) becomes logical '1', logical '1' is set to the output terminal R14. When M(2,14)(3) is logical '0', logical '0' is set to the output terminal R14. When M(2,15)(0) is logical '1', M(2,14)(2) is set to logical '0' regardless of the logical value of M(2,15)(1). When M(2,15)(1) is logical '1' and M(2,15)(0) is logical '0', M(2,14)(2) is set to logical '1'. This means that, in the ON and OFF operation in the second power switch circuit, the OFF operation has always priority over the ON operation. Accordingly, when ON and OFF data are simultaneously inputted into two data memory portions in the quite inversed manner, the OFF operation is preferentially performed.

When the respective operations on the basis of the contents of the comparison result memory portion is completed, the respective bits of M(2,14)(1)(0) and M(2,15)(3)(2)(1)(0) are all set to logical '0'. The CPU enters the execution of a normal routine.

A scale of 16 counter as the first counter in M(0,15) is used to make uniform the duty cycle of each digit in the display by the display 8. Every time each key state is checked, a state of the input terminal K8 is checked and it is judged whether the first counter is counted up or not. Each key state is checked and during a period that the respective digits of the display unit 8 are dynamically driven, only the first counter M(0,15) is counted. The judgement of the key states of the entire keys and the contents of the first counter after all the digits are driven for display for one cycle are added to M(1,15) of the clock counter, so that the first counter is reset to zero. In this connection, if such a method is employed that the first counter is not provided and M(1,15) of the clock counter is directly counted, the operation speed changes depending on values stored in M(1,15) and M(1,1) to M(1,7). The duty cycles of the respective digits also change, so that flicker occurs in the display. More specifically, the operation time varies in a range of the minimum time to count up M(1,15) by 1 to the maximum time taken for M(1,15) to be counted up one by one till the day-of-week digit of M(1,7). Accordingly, the duty cycles of the respective digits are different from each other. The duty cycle of the digit also changes dependent on whether M(0,15) is counted up or not. The number of instructions executed when it is counted up is larger than that when it is not counted up, so that the operation of the next digit is delayed. To avoid this, dummy instructions are used so as to have the same number of instructions between both the cases and to uniform the duty cycles of the digits.

FIG. 12 shows time charts for illustrating the display periods of the digits G1 to G7 and the time intervals between the adjacent digit display periods. In the figure, A represents the method of the embodiment according to the invention. B and C represent a method to directly count M(1,15). As seen from the timing chart A, the display periods (t1 to t2, t3 to t4, t5 to t6, t7 to t8, t9 to t10, t11 to t12, and t13 to t14) of the digits G1, G2, G3, G4, G6, G7 and G5, and intervals (t2 to t3, t4 to t5, t6 to t7, t8 to t9, t10 to t11 and t12 to t13) between the adjacent digit display periods, are uniform. As seen, the change ranges from the minimum time t19 having no carry when the contents of the first counter is added to M(1,15) to the maximum time t18 for counting up till the day-of-week digit of M(1,7). On the other hand, in the method for directly counting M(1,15), when a count-up signal is detected between the digits G1 and G2, the interval between the digits G1 and G2 varies a range from the minimum period t2 to t3 to the maximum period t2 to t5, as shown by B. When the count-up signal is detected between the digits G6 and G7, it varies a range from the minimum t10 to t11 and the maximum t10 to t13. Thus, a change of the time interval is indefinite. This causes flicker on the display.

According to the invention, the first counter used counts the pulse of the commercial power source frequency, after the key states of the whole keys are checked and all the digits are driven for display for one cycle, the count value of the first counter is added to M(1,15). Further, dummy instructions are introduced to make equal to each other the numbers of instructions executed for both the cases where the first counter has the count-up and has not the count-up. In this way, the embodiment of the invention makes uniform the display periods of the digits and the time intervals between the adjacent display period, whereby the flicker is eliminated.

In the clock display mode and the second counter display mode, the data is transferred from the respective memory portions of RAM 32 to the display memory portion when the lower digit counter M(1,1) produces a carry to the second digit counter M(1,2), that is, once for one second. In the data display mode, the data transfer is performed when the lower digit counter M(1,3) produces a carry to the minute digit counter M(1,4), that is, once for one minute. Eventually, the data transfers are carried out when the count value of the first counter M(0,15) is added to the clock counter M(1,15) and one-second and one-minute carries are produced. Therefore, the duty cycles of the digits are uniform.

Thus, when the day-of-week is designated and A.M. or P.M. is not designated, for example, M(0,7)(3)(2) of the set memory portion is checked when the "INPUT" key for transfer is operated to detect no designation, and then A.M. or P.M. flash mode is loaded into the flash mode memory portion. Through the A.M. or P.M. flash mode, the segments e and f of the digit G7 of the fluorescent display unit 8 is flashed to tell an operator to that effect. When A.M. or P.M. is designated and the day-of-week is not designated, check is made of the bit contents of M(0,0)(3)(2)(1)(0) and M(0,1)(2)(1)(0) when the "INPUT" key is operated. Through the check, no designation is detected and the day-of-week flash mode is set in the flash mode memory portion. The day-of-week flash mode set therein flashes all the day-of-week segments 8-7*b*, 8-6*b*, 8-5*b*, 8-4*b*, 8-3*b*, 8-2*c*, 8-1*c* of the display unit 8 to tell the operator to the effect. When the set clock data is not within 1:00 to 12:59, check is made of M(0,4), M(0,5), M(0,6), M(0,7)(1)(0) of the set memory portion when the key "INPUT" is operated. As a result, it is detected that the designation is erroneous, and the clock data flash mode is set in the flash mode memory portion. The clock data flash mode set therein causes the display unit 8 to display the erroneously set clock data in the flashing manner. When the operation data of the item to be controlled such as the snooze data, the alarm data, ON or OFF data is not designated, M(0,2)(1)(0) and M(0,3) of the set memory portion is checked at the time of the "INPUT" key operation. Through the check, no designation of the data is detected so that the operation flash mode is set in the flash mode memory portion. The operation flash mode set therein energizes the segments b and c of the digit G1 and the segments b, c, e and f of the digit G2 to flash them. As a matter of course, those controls are performed by the CPU under control of the program stored in the ROM 33. Thus, when the timer data is erroneous, the operator can know where the erroneous timer data is located in the entire timer data. Therefore, the operator can find the erroneous timer data and correct it in easy way. When the timer data is set in the set memory portion and the "INPUT" key is operated, whether the timer data is stored in the form of the hour data or the time data is judged depending on whether A.M., P.M. or the day-of-week is designated or not. When the timer data stored is the clock data, the timer data is transferred to the data memory portion with address displayed. When it is the time interval data, the clock data is read out from the clock counter and the time interval data is added to the clock data set. The result of the addition is stored in the set memory portion and then is displayed by the display unit 8. Through this operation, the clock data stored in the set memory portion is transferred to the data memory portion of which the address is displayed, by operating the "INPUT" key again. Accordingly, the timer data is set in the form of the time interval data, it is once converted into the clock data and then is displayed. Therefore, an operator can check whether the timer data set at that time is correct or not. Let us consider a case where, in setting the timer data to turn on the time switch at P.M. 1:30 on Wednesday, at A.M. 11:15 on the same day, the operator fails to set the designation of the day-of-week and P.M. The timer data is never set in the data memory portion through the depression of the "INPUT" key but it is merely converted into the clock data and is displayed as P.M. 12:45 on Wednesday by the display unit 8. Seeing this, the operator finds the timer data is erroneously set, and pushes the "CLEAR" key to correctly set the timer data. In the above case, when A.M. or P.M. is not designated, the CPU judges that the timer data is improper and displays it by the display unit 8. When the timer data to execute the timer operation after 2 hours is erroneously set at A.M. 11:15, or after three hours, the display unit 8 displays P.M. 2:15 on Wednesday. Accordingly, the operator can easily find its erroneous setting. As described above, when the timer data to be stored in the form of the clock data is erroneously stored in the form of the time interval data, or in the reversal case, the timer data is not transferred to the data memory portion, but is converted into the clock data and then is displayed. Accordingly, the operator can find its error at that time. Thus, the timer data erroneously set is never stored in the data memory portion. Therefore, there is eliminated a troublesome work to erase the contents of the data memory to correct the erroneous one.

With respect to the addition of the contents of the clock counter and the clock data when the timer data set is the time interval data, 4-bit parallel addition is applied for the minute and the 10-minute digits. For the hour digit, 1 is successively subtracted from the value representing the hour digit of the time interval data set in the clock counter while 1 is successively added to it. This operation continues until the hour digit value of the time interval data becomes zero. Accordingly, A.M., P.M. or the day-of-week may be changed on the basis of the hour digits value in the clock counter. Accordingly, the change of those may be made easily and further the number of the instructions may be reduced.

The above-mentioned embodiment relates to the timer of one-week system for setting the day-of-week. Many modifications are possible within the scope of the invention. For example, the timer of the type in which the day-of-week is not designated is allowable. In this case, whether the timer data set takes the form of the clock data or the time interval data is judged by merely checking whether A.M. or P.M. is designated or not. Further, the item to be controlled is not limited to both the time switch and sound device, but may be either of them. In the embodiment mentioned above, the input section 6 is provided with ten keys "WEEK", "0/EW", "1/MON", "2/TUE", "3/WED", "4/THU", "5/FRI", "6/SAT", "7/SUN", "8/M to F", and "9/M to S". The "WEEK" key inverts the bit contents of the colon display memory of M(0,8)(3). When M(0,8)(3) is logical '0', the ten keys are used as entry keys to enter the clock data in the device. When M(0,8) (3) is logical '1', the ten keys are used as the keys for designating the day-of-week to enter the day-of-week data into the device. When the ten keys serve as the day-of-week designation key, "1/MON" to "7/SUN" designated Monday to Sunday, "8/M to F" designates Monday to Friday as a whole, "9/M to S" designates Monday to Sunday as a whole, and "O/EW" selects the every-week operation or the one-week operation. Specifically, when the keys "1/MON" to "9/M to S" are depressed, logical '1' is set to the memories of M(2 to 7, 6 or 13) (3) (2) (1) (0) and M(2 to 7, 1 or 8) (2) (1) (0) of those data memory portions M(2 to 7, 0 or 7) to M(2 to 7, 6 or 13). When the "O/EW" key is depressed, logical '1' is set in M(2 to 7, 1 or 8) (3). It is accomplished by that logical '1' is set in the corresponding bits of the input buffers M(0,0), M(0,1) and transferred to be stored in each data storage by the input key action. When M(2 to 7, 1 or 8) (3) contains logical '1', the memory portion is not erased even if the operation dependent on the timer data stored in the data memory portion, starts. When M(2 to 7, 1 or 8) (3) contains logical '0', upon the start of the operation dependent on the timer data stored in the timer memory portion, the memory portion is erased and the erased memory portion serves as the unloaded memory portion read for the new timer data to be loaded thereinto. Accordingly, the ten entry keys are used as the day-of-week designation keys, the "O/EW" key may select the timer data to be set for the every-week operation or for the one-week operation. The selection eliminates the troublesome work to erase the timer data after the timer operation, improving the operability of the timer device.

The above-mentioned embodiment uses the first and second switches as the sound device and the time switch. Either of those may also be used as the object to be controlled within the scope of the invention.

The data memory portions M(2 to 7, 0 or 7) to M(2 to 7, 6 or 13) are provided with the day-of-week data memories M(2 to 7, 1 or 8) (3) (2) (1) (0) and M(2 to 7, 1 or 8) (2) (1) (0). The arrangement enables one or more of the day-of-week data from Monday to Sunday to be set. Accordingly, the timer operation at the timer clock data set in the data memory portion may be performed depending on the day-of-week data set. For this, when the same timer operation at the timer clock data is performed on Tuesday, Wednesday and Saturday, the data memory used may be one, so that the data memory portion may be effectively used. Moreover, the input section 6 is provided with the "WEEK" key which inverts the bit contents of the colon display memory of M(0,8) (3). When M(0,8) (3) is logical '0', the ten keys "O/EW", "1/MON", "2/TUE", "3/WED", "4/THU", "5/FRI", "6/SAT", "7/SUN", "8/M to F", and "9/M to S" are used as entry keys for setting the clock data. When M(0,8) (3) is logical '1', the ten keys "O/EW" to "9/M to S" are used as the day-of-week designation keys for setting the day-of-week data. Accordingly, though the kind of the input data is 20, the number of the keys actually used is only 11. This is useful in saving the space of the input section 6, leading to the timer device small in size.

The key "8/M to F" designates five day-of-week data from Monday to Friday together in the day-of-week designation mode. Similarly, the key "9/M to S" may designate Monday to Sunday together. This improves the key operation. The "O/EW" is used as the every-week operation in the day-of-week designation mode. When "O/EW" key designates the every-week operation, the logical '1' is loaded into M(2 to 7, 1 or 8) (3). The timer operation at the timer clock data set in the data memory portion may be performed every week on the basis of the day-of-week data set. When the key is not operated, if the timer operation at the timer clock data set in the data memory portion is carried out in accordance with the day-of-week data set, the corresponding day-of-week data alone is erased. Accordingly, when all the day-of-week data are erased from the day-of-week data memory, the timer data of the data memory portion is erased and the erased data memory portion is used as the unloaded memory portion read for the new data input thereinto. Therefore, the one-week operation or the every-week operation may easily be selected through one entry key. The above-mentioned embodiment is provided with two switches, the first switch and the second switch, for the sound device and the time switch as the controlled object. However, either of them may be used instead of both.

What is claimed is:

1. An electronic timer, comprising:

timer input data designating means for randomly designating timer input data, including day of the week, AM or PM and time of the day constituents, to control the operation of at least one selected device;

buffer memory means, electrically connected to said timer input designating means, for temporarily storing the timer input data specified by said timer input data designating means;

data storage means, electrically connected to said buffer memory means, for storing timer input data from said buffer memory means;

data transfer means, electrically connected to said buffer memory means for transferring the timer input data from said buffer memory means to said data storage means and vice versa;

display means, electrically connected to said buffer memory means, for displaying at least timer input data stored in said buffer memory means;

judgment means, electrically connected to said buffer memory means, for judging if each constituent of the timer input data is correctly and completely entered before the transfer operation of the timer input data from said buffer memory means to said data storage means is initiated by said data transfer means; and designation error display control means, electrically connected to said judgment means and said display means, for controlling said display means whereby an erroneous or missing constituent of the timer input data is indicated on the display means whenever erroneous or missing constituents of the timer input data is detected by said judgment means.

2. An electronic timer according to claim 1, wherein said designation error display control means causes said display means to flash a display element corresponding to the constituent of the timer input data judged to be erroneous or missing.

3. An electronic timer according to claim 1, wherein said timer input data includes the designating data of A.M. and P.M. and said display means includes display elements for A.M. and P.M., and when A.M. or P.M. is not designated, said designation error display control means causes said corresponding display element to flash.

4. An electronic timer according to claim 1, wherein the timer input data includes data for designating a day of the week and said display means includes display elements to represent the respective days of the week, and when a day of the week is not designated, said designation error display control means causes all of the display elements which represent the respective days of the week to flash.

5. An electronic timer according to claim 1, wherein the number of selected devices to be controlled by the timer input data is plural, said display means includes display elements for the selected devices to be controlled, and when the operation data for any of the selected devices is not designated, said designation error display control means causes all of the display elements for the operation data to flash.

6. An electronic timer according to claim 1, wherein said designation error display control means is a microprocessor controlled by a program stored in a read only memory.

7. The electronic time according to claim 1, further comprising:

timer input data erasing means, electrically connected to said data storage means and said buffer memory means, for automatically erasing timer input data stored in said data storage means after said data input data is used; and said timer input data designating means including means for selectively designating the operation of said erasing means.

8. An electronic timer according to claim 7, wherein said timer input data designating means includes entry keys for setting at least operation data, said operation data including operation clock data and operation day-of-week data, and a switch key for switching said entry key to select said operation clock data designation or to select the operation day-of-week data designation, and said means for selectively designating is one of the entry keys.

9. An electronic timer according to claim 8 or claim 7, wherein said erasing means includes a microprocessor controlled by a program stored in a read only memory.

10. An electronic timer, comprising:

timer input data designating means for designating timer input data, including input clock data, operation data and time interval data constituents, to control the operation of a selected device;

buffer memory means, electrically connected to said timer input data designating means, for temporarily storing the input data specified by said timer input data designating means;

data storage means, electrically connected to said buffer memory means, for storing input clock data and the operation data provided from said buffer memory means;

clock counter means for counting actual clock data;

data transfer means, electrically connected to said buffer memory means and said data storage means, for transferring the input clock data and the operation data from said buffer memory means to said data storage means and vice versa;

display means, electrically connected to said buffer memory means, for displaying the input data stored in said buffer memory means;

judgment means, electrically connected to said buffer memory means and said data transfer means, for judging whether said input data stored in said buffer memory means is input clock data or time interval data;

adding means, electrically connected to said buffer memory means and said clock counter means, for adding said time interval data stored in said buffer memory means to said actual clock data counted by said clock counter means, so that the resultant clock data is stored in said buffer memory means and displayed by said display means; and said judgment means judging that the input clock data is supplied from said timer input data designating means to said buffer memory means so that said data transfer means transfers the input data stored in said buffer memory means to said data storage means, wherein said input clock data including an A.M. or P.M. designation and a day-of-week designation and said judgment means determines whether the timer input data is input clock data or time interval data by detecting the absence or presence of the A.M./P.M. and the day-of-week designations, such judgment means determining the timer input data to be input clock data whenever at least an A.M./P.M. designation or day-of-week designation is made and causing such display means to indicate which designation is omitted when only an A.M./P.M. designation or day-of-week designation is made.

11. An electronic timer according to claim 10, wherein said judgement means is a microprocessor controlled by a program stored in a read only memory.

12. An electronic timer according to claim 10, wherein said actual clock data of said clock counter means comprises a 1/10-second digit, a 1-second digit, a 10-second digit, a 1-minute, a 10-minute digit, and a 1-hour digit; and the addition of said time interval data to said actual clock data is so performed without any qualification for the digits lower than the 10-minute digit to determine if A.M. should be changed to P.M. or P.M. should be changed to A.M., and if day-of-week should be changed, when converting said time interval data constituent to an input clock data constituent, by incrementing hour digit data of said actual clock data by one and decrementing hour digit data of said time interval data constituent by one until said hour digit of said time interval data constituent becomes zero.

13. An electronic timer, comprising:

timer input data designating means for designating timer input data, including input clock data and operation data to control the operation of a selected device;

buffer memory means, electrically connected to said timer input data designating means, for temporarily storing timer input data specified by said timer input data designating means;

data storage means, electrically connected to said buffer memory means for storing the input clock data and the operation data provided from said buffer memory means;

data transfer means, electrically connected to said buffer memory means for transferring the timer input data from said buffer memory to said data storage means and vice versa in response to the operation of said timer input data designating means;

clock counter means, electrically connected to said data storage means, for counting a clock pulse generated in said timer indicative of actual clock data;

display means, electrically connected to said buffer memory means, for displaying the timer input data stored in said buffer memory means;

flick-free means, electrically connected to said display means, for preventing flicker of said display means by inhibiting any carry functions of said clock counter means while said display means is driven;

said clock counter means including first and second clock counter means for counting said clock pulse;

said data transfer means for transferring the input clock data and the operation data from said buffer means to said data storage means and vice versa, while transferring the input clock data or the actual clock data from said buffer memory means to said first counter means and vice versa;

said display means including a plurality of display segments;

display drive means, electrically connected to said display means and said buffer memory means, for dynamically driving said display segments in accordance with the input data stored in said buffer memory means; and said flicker-free means including clock counter control means, electrically connected to said first and second clock counter means, for enabling said second clock counter means to count the clock pulse during the driving period of said display segments while disabling said first clock counter means to count the clock pulse at the same time and for adding the contents of said second clock counter means to those of said first clock counter during a period of time when said display segments are not driven.

14. An electronic timer according to claim 13, wherein said display driver means further includes means for driving each of said display segments for substantially the same period of time.

15. An electronic timer according to claim 14, further comprising:

scanning means, electrically coupled with said display driver means, for scanning said input data designating means in synchronism with the operation of said display driver means.

* * * * *